United States Patent
Lemons

(10) Patent No.: US 7,932,454 B2
(45) Date of Patent: Apr. 26, 2011

(54) SYSTEM AND METHOD FOR MUSICAL INSTRUCTION

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 372 days.

(21) Appl. No.: 12/148,303

(22) Filed: Apr. 18, 2008

(65) Prior Publication Data

US 2008/0271591 A1    Nov. 6, 2008

Related U.S. Application Data

(60) Provisional application No. 60/912,453, filed on Apr. 18, 2007, provisional application No. 60/912,486, filed on Apr. 18, 2007, provisional application No. 60/912,772, filed on Apr. 19, 2007, provisional application No. 61/028,723, filed on Feb. 14, 2008.

(51) Int. Cl.
| G09B 15/02 | (2006.01) |
| A63J 17/00 | (2006.01) |
| A63J 5/10 | (2006.01) |
| G10H 1/00 | (2006.01) |

(52) U.S. Cl. ..................................... 84/483.2; 84/464 R

(58) Field of Classification Search .................. 345/440, 345/440.1, 440.2, 441, 442, 443, 473; 700/94; 645/10–24; 84/464 R, 464 A, 477 R, 478, 84/483.2

See application file for complete search history.

(56) References Cited

U.S. PATENT DOCUMENTS

| 2,804,500 | A | 8/1957 | Giacoletto |
| 3,969,972 | A | 7/1976 | Bryant |
| 4,128,846 | A | 12/1978 | Robinson, Jr. |
| 4,172,406 | A | 10/1979 | Martinez |
| 4,257,062 | A | 3/1981 | Meredith |
| 4,378,466 | A | 3/1983 | Esser |
| 4,526,168 | A | 7/1985 | Hassler et al. |

(Continued)

FOREIGN PATENT DOCUMENTS

EP    0349686 A1    1/1990

(Continued)

OTHER PUBLICATIONS

"Time-line of the Music Animation Machine (and related experiments)", Music Animation Machine: History, http://www.musanim.com/mam/mamhist.htm, pp. 1-5, p. 1, pp. 1-2, pp. 1-2 & p. 1, printed Aug. 30, 2007.

(Continued)

*Primary Examiner* — Elvin G Enad
*Assistant Examiner* — Andrew R Millikin
(74) *Attorney, Agent, or Firm* — Woodard, Emhardt, Moriarty, McNett & Henry, LLP

(57) ABSTRACT

The present disclosure relates to music instruction devices and methods. A system is provided which allows a user to more intuitively understand music theory and performance. The system also streamlines composition and arrangement in multi-instrument environments. The user is able to select from a variety of available music visualizations and instrument views, allowing comparison therebetween. The system may comprise a step-by-step instruction method, free-play performance abilities, and recording and playback features. Certain embodiments incorporate statistical analysis of student progress, remote access for teacher consultation, and video games for enhancing student interest.

31 Claims, 19 Drawing Sheets
(11 of 19 Drawing Sheet(s) Filed in Color)

U.S. PATENT DOCUMENTS

| | | | |
|---|---|---|---|
| 4,887,507 | A | 12/1989 | Shaw |
| 4,907,573 | A | 3/1990 | Nagasaki |
| 5,048,390 | A | 9/1991 | Adachi et al. |
| 5,207,214 | A | 5/1993 | Romano |
| 5,370,539 | A | 12/1994 | Dillard |
| 5,415,071 | A | 5/1995 | Davies |
| 5,563,358 | A | 10/1996 | Zimmerman |
| 5,741,990 | A | 4/1998 | Davies |
| 5,784,096 | A | 7/1998 | Paist |
| 6,031,172 | A | 2/2000 | Papadopoulos |
| 6,111,755 | A | 8/2000 | Park |
| 6,127,616 | A | 10/2000 | Yu |
| 6,137,041 | A | 10/2000 | Nakano |
| 6,201,769 | B1 | 3/2001 | Lewis |
| 6,245,981 | B1 | 6/2001 | Smith |
| 6,390,923 | B1 | 5/2002 | Yoshitomi et al. |
| 6,392,131 | B2 | 5/2002 | Boyer |
| 6,411,289 | B1 | 6/2002 | Zimmerman |
| 6,448,487 | B1 | 9/2002 | Smith |
| 6,350,942 | B1 | 12/2002 | Thomson |
| 6,544,123 | B1 | 4/2003 | Tanaka et al. |
| 6,686,529 | B2 | 2/2004 | Kim |
| 6,750,386 | B2 | 6/2004 | King |
| 6,791,568 | B2 | 9/2004 | Steinberg et al. |
| 6,841,724 | B2 | 1/2005 | George |
| 6,856,329 | B1 | 2/2005 | Peevers et al. |
| 6,927,331 | B2 | 8/2005 | Haase |
| 6,930,235 | B2 | 8/2005 | Sandborn et al. |
| 7,030,307 | B2 | 4/2006 | Wedel |
| 7,096,154 | B1 | 8/2006 | Adrade-Cetto |
| 7,153,139 | B2 | 12/2006 | Wen et al. |
| 7,182,601 | B2 | 2/2007 | Donnan |
| 7,212,213 | B2 | 5/2007 | Steinberg et al. |
| 7,271,328 | B2 | 9/2007 | Pangrie |
| 7,271,329 | B2 | 9/2007 | Franzblau |
| 7,400,361 | B2 | 7/2008 | Noske et al. |
| 7,521,619 | B2 | 4/2009 | Salter |
| 7,663,043 | B2 | 2/2010 | Park |
| 7,667,125 | B2 | 2/2010 | Taub et al. |
| 7,714,222 | B2 | 5/2010 | Taub et al. |
| 2002/0176591 | A1 | 11/2002 | Sandborn et al. |
| 2003/0205124 | A1 | 11/2003 | Foote et al. |
| 2004/0089132 | A1 | 5/2004 | Georges et al. |
| 2004/0148575 | A1 | 7/2004 | Haase |
| 2004/0206225 | A1 | 10/2004 | Wedel |
| 2005/0190199 | A1 | 9/2005 | Brown et al. |
| 2005/0241465 | A1 | 11/2005 | Goto |
| 2007/0044639 | A1 | 3/2007 | Farbood et al. |
| 2007/0157795 | A1 | 7/2007 | Hung |
| 2007/0180979 | A1 | 8/2007 | Rosenberg |
| 2008/0022842 | A1 | 1/2008 | Lemons |
| 2008/0034947 | A1 | 2/2008 | Sumita |
| 2008/0115656 | A1 | 5/2008 | Sumita |
| 2008/0190271 | A1 | 8/2008 | Taub et al. |
| 2008/0264239 | A1 | 10/2008 | Lemons et al. |
| 2008/0271589 | A1 | 11/2008 | Lemons |
| 2008/0271590 | A1 | 11/2008 | Lemons |
| 2008/0271591 | A1 | 11/2008 | Lemons |
| 2008/0276790 | A1 | 11/2008 | Lemons |
| 2008/0276791 | A1 | 11/2008 | Lemons |
| 2008/0276793 | A1 | 11/2008 | Yamashita et al. |
| 2008/0314228 | A1 | 12/2008 | Dreyfuss et al. |
| 2009/0223348 | A1 | 9/2009 | Lemons |
| 2010/0154619 | A1 | 6/2010 | Taub et al. |

FOREIGN PATENT DOCUMENTS

| | | |
|---|---|---|
| EP | 456 860 A1 | 11/1991 |
| EP | 135461 A1 | 10/2003 |
| JP | 05-232856 | 9/1993 |
| JP | 2004-226556 A | 8/2004 |
| KR | 10-2006-0110988 | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/surfaces_curves/harmonograph/, pp. 1-6, printed Aug. 30, 2007.

Dunne, Gabriel, "Color/Shape/Sound Ratio & Symmetry Calculator," Quilime.com—Symmetry Calculator, https://www.quilime.com/content/colorcalc/, pp. 1-6, printed Jul. 3, 2007.

Patent Application Search Report mailed on Aug. 18, 2008 for PCT/US2008/005069.

Patent Application Search Report mailed on Sep. 18, 2008 for PCT/US2008/005072.

Patent Application Search Report mailed on Sep. 18, 2008 for PCT/US2008/005124.

Patent Application Search Report mailed on Sep. 24, 2008 for PCT/US2008/005125.

Patent Application Search Report mailed on Sep. 29, 2008 for PCT/US2008/005074.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005073.

Patent Application Search Report Mailed on Aug. 18, 2008 for PCT/US2008/5126.

Patent Application Search Report mailed on Aug. 21, 2008 for PCT/US2008/005076.

Patent Application Search Report mailed on Aug. 27, 2008 for PCT/US2008/005075.

Patent Application Search Report mailed on Aug. 28, 2008 for PCT/US2008/005077.

Patent Application Search Report mailed on Jul. 31, 2008 for PCT/US2008/005070.

Rabiner, Huang "Fundamentals of Speech Recognition," PTR Prentice-Hall, Inc., 1993, ISBN 0-13-285826-6, pp. 21-31, 42-68; Fig. 2.17, 2.32.

Patent Application Search Report mailed on Aug. 25, 2009 for PCT/US2009/000684.

Written Opinion mailed on Aug. 25, 2009 for PCT/US2009/00684.

SYSTEM AND METHOD FOR MUSICAL INSTRUCTION

CROSS-REFERENCE TO RELATED APPLICATIONS

The present application claims the benefit of U.S. Provisional Patent Application Ser. No. 60/912,453, filed Apr. 18, 2007, entitled "Method of Music Instruction", U.S. Provisional Patent Application Ser. No. 60/912,486 filed Apr. 18, 2007 entitled "Apparatus and Method for Enhancing Music Education", U.S. Provisional Patent Application Ser. No. 60/912,772, filed Apr. 19, 2007, entitled "Apparatus and Method for Improving the Understanding of Musical Notation Through the Use of Tonal and Rhythm Visualization Systems", and U.S. Provisional Patent Application Ser. No. 61/028,723 filed Feb. 14, 2008 entitled "System and Method for Musical Instruction". This application also relates to U.S. Provisional Patent Application Ser. No. 60/830,386 filed Jul. 12, 2006 entitled "Apparatus and Method for Visualizing Musical Notation", U.S. Utility patent application Ser. No. 11/827,264 filed Jul. 11, 2007 entitled "Apparatus and Method for Visualizing Music and Other Sounds", U.S. Provisional Patent Application Ser. No. 60/921,578, filed Apr. 3, 2007, entitled "Device and Method for Visualizing Musical Rhythmic Structures", and U.S. Utility patent application Ser. No. 12/023,375 filed Jan. 31, 2008 entitled "Device and Method for Visualizing Musical Rhythmic Structures". All of these applications are hereby incorporated by reference in their entirety.

TECHNICAL FIELD OF THE DISCLOSURE

The present disclosure relates generally to music education and, more specifically, to a system and method for musical instruction using analysis of tonal and rhythmic structures.

BACKGROUND OF THE DISCLOSURE

Students are traditionally taught how to play a musical instrument through the use of books or printed materials that include songs or practice pieces, comprising notes on a staff, that increase in difficulty or complexity as the student progresses and improves in playing technique. This process requires significant practice that relies upon the student learning to "hear" or recognize the proper sound of particular notes or chords. The ability to recognize the proper sound is necessary to determine if the musical piece is being played properly. During actual instruction time, the teacher or music instructor can help the student recognize the correct sounds, but outside of the classroom or instructional environment the student is left to determine on his or her own whether a note or piece of music is being played correctly. The process is further complicated by the counterintuitive nature of traditional staff notation. Methods are needed which improve the efficiency and quality of musical education.

SUMMARY OF THE INVENTION

Accordingly, in one aspect, a music instruction system is disclosed, comprising: a processing device; and a display; wherein: said processing device executes computer readable code to create a first visual representation of musical information for output on said display; and wherein: said first visual representation is generated according to a method comprising the steps of: (a) labeling the perimeter of a circle with twelve labels corresponding to twelve respective notes in an octave, such that moving clockwise or counter-clockwise between adjacent ones of said labels represents a musical half-step; (b) identifying an occurrence in the musical information of a first one of the twelve notes; (c) identifying an occurrence in the musical information of a second one of the twelve notes; (d) identifying a first label corresponding to the first note; (e) identifying a second label corresponding to the second note; (f) creating a first line connecting the first label and the second label, wherein: (1) said first line is a first color if the first note and the second note are separated by a half step; (2) said first line is a second color if the first note and the second note are separated by a whole step; (3) said first line is a third color if the first note and the second note are separated by a minor third; (4) said first line is a fourth color if the first note and the second note are separated by a major third; (5) said first line is a fifth color if the first note and the second note are separated by a perfect fourth; and (6) said first line is a sixth color if the first note and the second note are separated by a tri-tone.

According to another embodiment, a method of music instruction is disclosed, comprising the steps of: (a) labeling the perimeter of a circle with twelve labels on a display corresponding to twelve respective notes in an octave, such that moving clockwise or counter-clockwise between adjacent ones of said labels represents a musical half-step; (b) receiving musical information; (c) identifying an occurrence in the musical information of a first one of the twelve notes; (d) identifying an occurrence in the musical information of a second one of the twelve notes; (e) identifying a first label corresponding to the first note; (f) identifying a second label corresponding to the second note; (g) creating a first line connecting the first label and the second label on the display, wherein: (1) said first line is a first color if the first note and the second note are separated by a half step; (2) said first line is a second color if the first note and the second note are separated by a whole step; (3) said first line is a third color if the first note and the second note are separated by a minor third; (4) said first line is a fourth color if the first note and the second note are separated by a major third; (5) said first line is a fifth color if the first note and the second note are separated by a perfect fourth; and (6) said first line is a sixth color if the first note and the second note are separated by a tri-tone.

According to another embodiment, a method of music instruction is disclosed, comprising the steps of: (a) labeling the perimeter of a circle with labels corresponding with twelve respective notes in an octave on a display, such that moving clockwise or counter-clockwise between adjacent ones of said labels represents a musical half-step; (b) displaying a first line connecting a first label and a second label on the circle; (c) identifying an occurrence of a first note played by a user; (d) identifying an occurrence of a second note played by a user; (e) visually enhancing said first line on the display if said first label corresponds to said first note and said second label corresponds to said second note; wherein: (1) said visual enhancement of said first line is a first color if the first note and the second note are separated by a half step; (2) said visual enhancement of said first line is a second color if the first note and the second note are separated by a whole step; (3) said visual enhancement of said first line is a third color if the first note and the second note are separated by a minor third; (4) said visual enhancement of said first line is a fourth color if the first note and the second note are separated by a major third; (5) said visual enhancement of said first line is a fifth color if the first note and the second note are separated by a perfect fourth; and (6) said visual enhancement of said first line is a sixth color if the first note and the second note are separated by a tri-tone.

According to another embodiment, a music instruction system is disclosed, comprising: a processing device; and a display; wherein: said processing device executes computer readable code to create a first visual representation of musical information for output on said display; and wherein: said first visual representation is generated according to a method comprising the steps of: (a) providing a helix having a plurality of turns; (b) labeling the perimeter of the helix with labels, wherein: (1) each turn of the helix has a respective plurality of labels corresponding to a plurality of respective notes in a respective octave; and (2) moving clockwise or counter-clockwise on the helix from any label to an adjacent label represents a first interval; (c) identifying an occurrence in the musical information of a first note; (d) identifying which of the plurality of respective notes and which respective octave corresponds to the first note; (e) identifying an occurrence in the musical information of a second note; (f) identifying which of the plurality of respective notes and which respective octave corresponds to the second note; (g) identifying a first label corresponding to the first note; (h) identifying a second label corresponding to the second note; (i) creating a first line connecting the first label and the second label, wherein: (1) each line is a first color if the first note and the second note are separated by the first interval; (2) each line is a second color if the first note and the second note are separated by a second interval; (3) each line is a third color if the first note and the second note are separated by a third interval; (4) each line is a fourth color if the first note and the second note are separated by a fourth interval; (5) each line is a fifth color if the first note and the second note are separated by a fifth interval; and (6) each line is a sixth color if the first note and the second note are separated by a sixth interval.

According to another embodiment, a method of music instruction is disclosed, comprising the steps of: (1) displaying a visual representation of musical information on a display, whereby said visual representation is generated by a method comprising the steps of: (a) providing a helix having a plurality of turns on the display; (b) labeling the perimeter of the helix with labels, wherein: (1) each turn of the helix has a respective plurality of labels corresponding to a plurality of respective notes in a respective octave; and (2) moving clockwise or counter-clockwise on the helix from any label to an adjacent label represents a first interval; (c) identifying an occurrence in the musical information of a first note; (d) identifying which of the plurality of respective notes and which respective octave corresponds to the first note; (e) identifying an occurrence in the musical information of a second note; (f) identifying which of the plurality of respective notes and which respective octave corresponds to the second note; (g) identifying a first label corresponding to the first note; (h) identifying a second label corresponding to the second note; (i) creating a first line connecting the first label and the second label on the display, wherein: (1) each line is a first color if the first note and the second note are separated by the first interval; (2) each line is a second color if the first note and the second note are separated by a second interval; (3) each line is a third color if the first note and the second note are separated by a third interval; (4) each line is a fourth color if the first note and the second note are separated by a fourth interval; (5) each line is a fifth color if the first note and the second note are separated by a fifth interval; and (6) each line is a sixth color if the first note and the second note are separated by a sixth interval.

According to another embodiment, a method of music instruction is disclosed, comprising the steps of: (a) providing a helix having a plurality of turns; (b) labeling the perimeter of the helix with labels, wherein: (1) each turn of the helix has a respective plurality of labels corresponding to a plurality of respective notes in a respective octave; and (2) moving clockwise or counter-clockwise on the helix from any label to an adjacent label represents a first interval; (c) displaying a first line connecting a first label and a second label on the helix; (c) identifying an occurrence in the musical information of a first note played by a user; (d) identifying which of the plurality of respective notes and which respective octave corresponds to the first note; (e) identifying an occurrence of a second note played by a user; (f) identifying which of the plurality of respective notes and which respective octave corresponds to the second note; (g) identifying a first label corresponding to the first note; (h) identifying a second label corresponding to the second note; (i) visually enhancing said first line on the display if said first label corresponds to said first note and said second label corresponds to said second note; wherein: (1) each line is a first color if the first note and the second note are separated by the first interval; (2) each line is a second color if the first note and the second note are separated by a second interval; (3) each line is a third color if the first note and the second note are separated by a third interval; (4) each line is a fourth color if the first note and the second note are separated by a fourth interval; (5) each line is a fifth color if the first note and the second note are separated by a fifth interval; and (6) each line is a sixth color if the first note and the second note are separated by a sixth interval.

According to another embodiment, a music instruction system is disclosed, comprising: a processing device; and a display; wherein: said processing device executes computer readable code to create a first visual representation of a musical information for output on said display; and wherein: (1) said visual representation comprises a first substantially circular shape having a first maximum diameter if said musical information represents the sounding of a first rhythmic instrument; said first rhythmic instrument having a first primary frequency; (2) said visual representation comprises a second substantially circular shape if said musical information represents the sounding of a second rhythmic instrument; said second rhythmic instrument having a second primary frequency that is higher than said first primary frequency; said second substantially circular shape having a second maximum diameter which is greater than said first maximum diameter; and (3) said visual representation comprises a third substantially circular shape if said musical information represents the sounding of a third rhythmic instrument; said third rhythmic instrument having a third primary frequency that is higher than said second primary frequency; said third substantially circular shape having a third maximum diameter which is greater than said second maximum diameter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
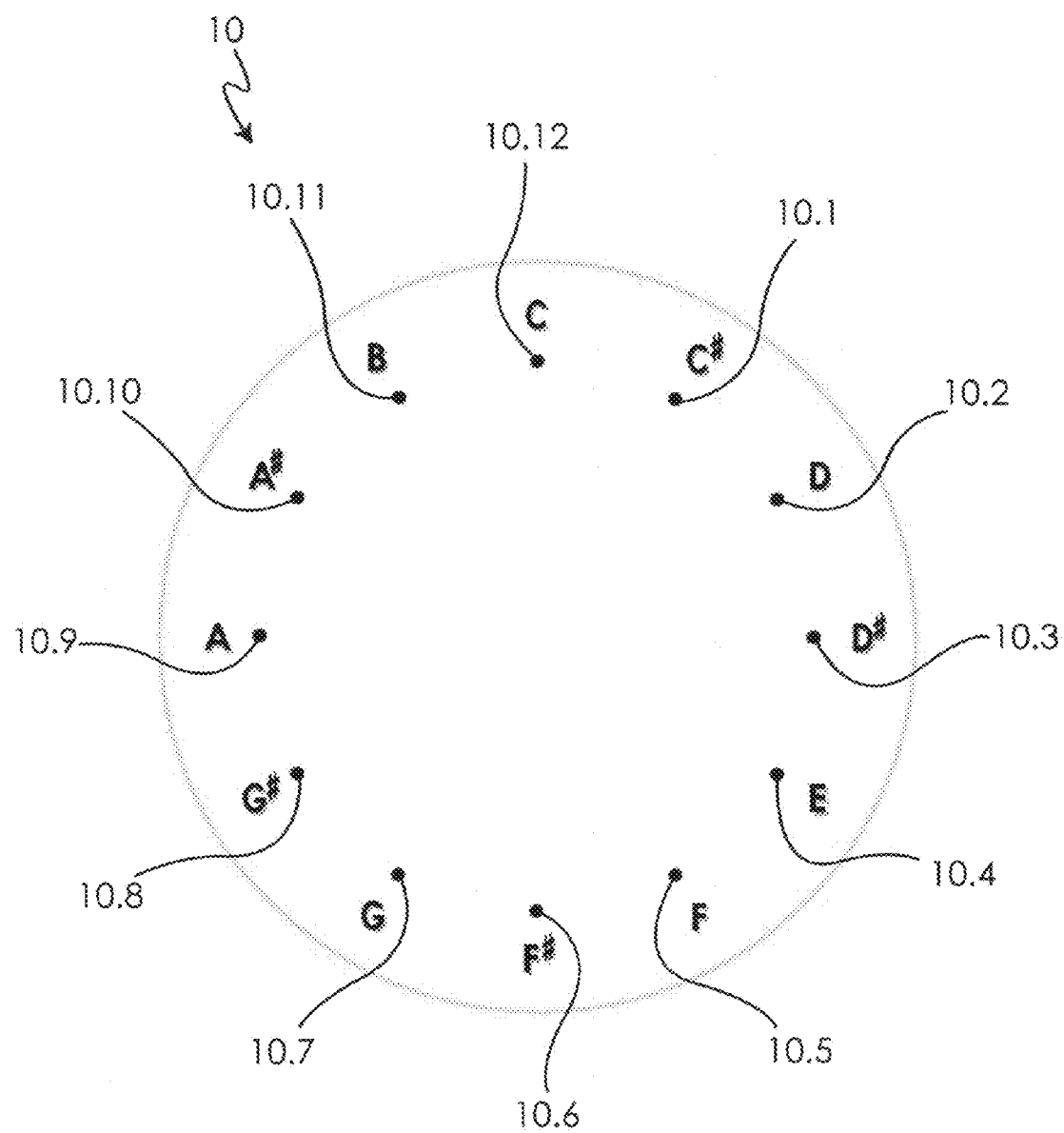
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the system and method for music instruction, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

Major scale: 2 steps, 2 steps, 1 step, 2 steps, 2 steps, 2 steps, 1 step

Harmonic Minor Scale: 2, 1, 2, 2, 1, 3, 1

Melodic Minor Scale: 2, 1, 2, 2, 2, 2, 1

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (#'s) and 'flats' (b's) to cover the remaining five tones so that a single notation system can be used to encompass all three scales. For example, certain key signatures will have seven 'pure letter' tones (like 'A') in addition to sharp or flat tones (like $C^{\#}$ or $G^{\flat}$), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., $A^{\#}$ is the same as $B^{\flat}$), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
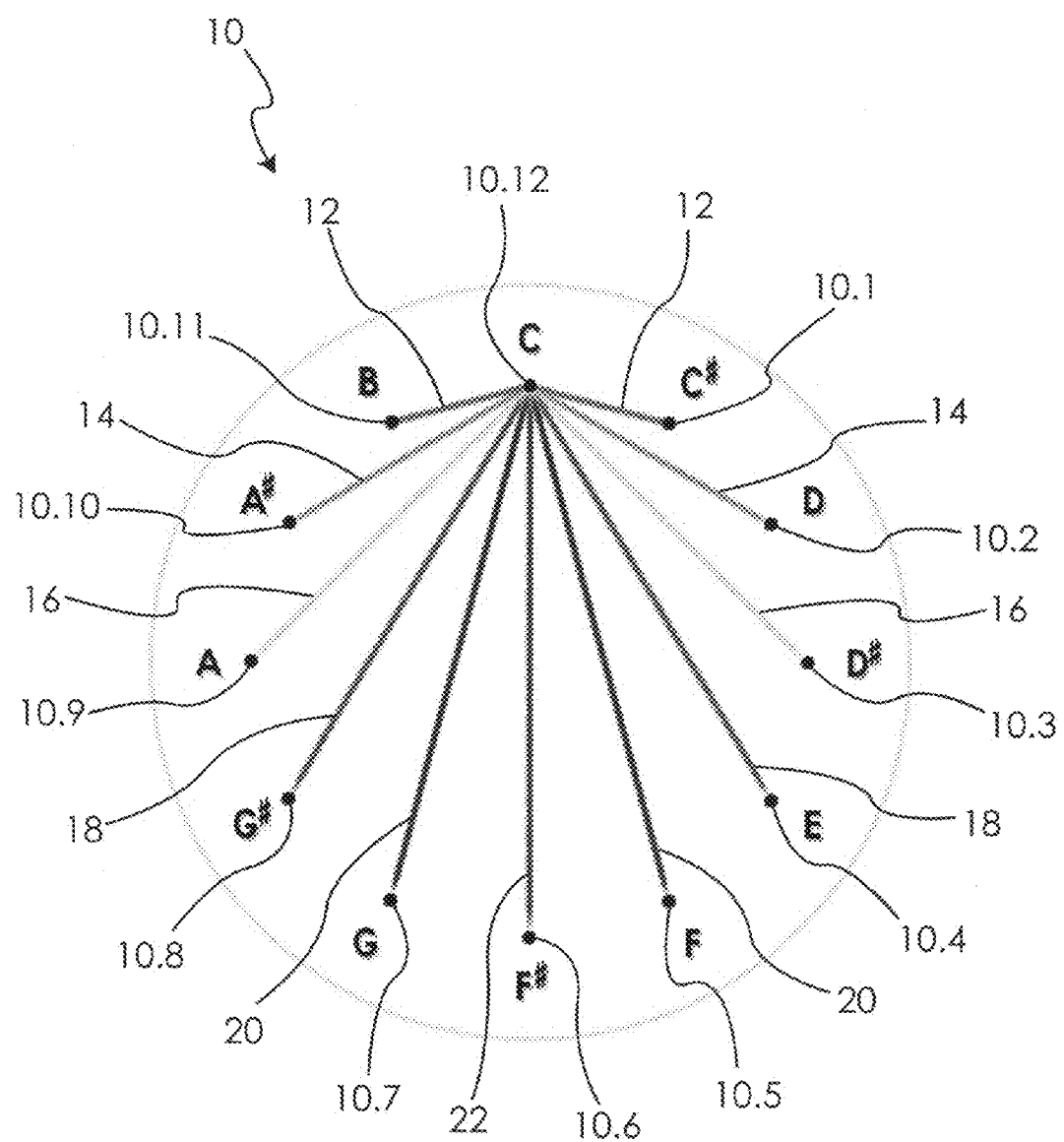
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and $A^{\#}$ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
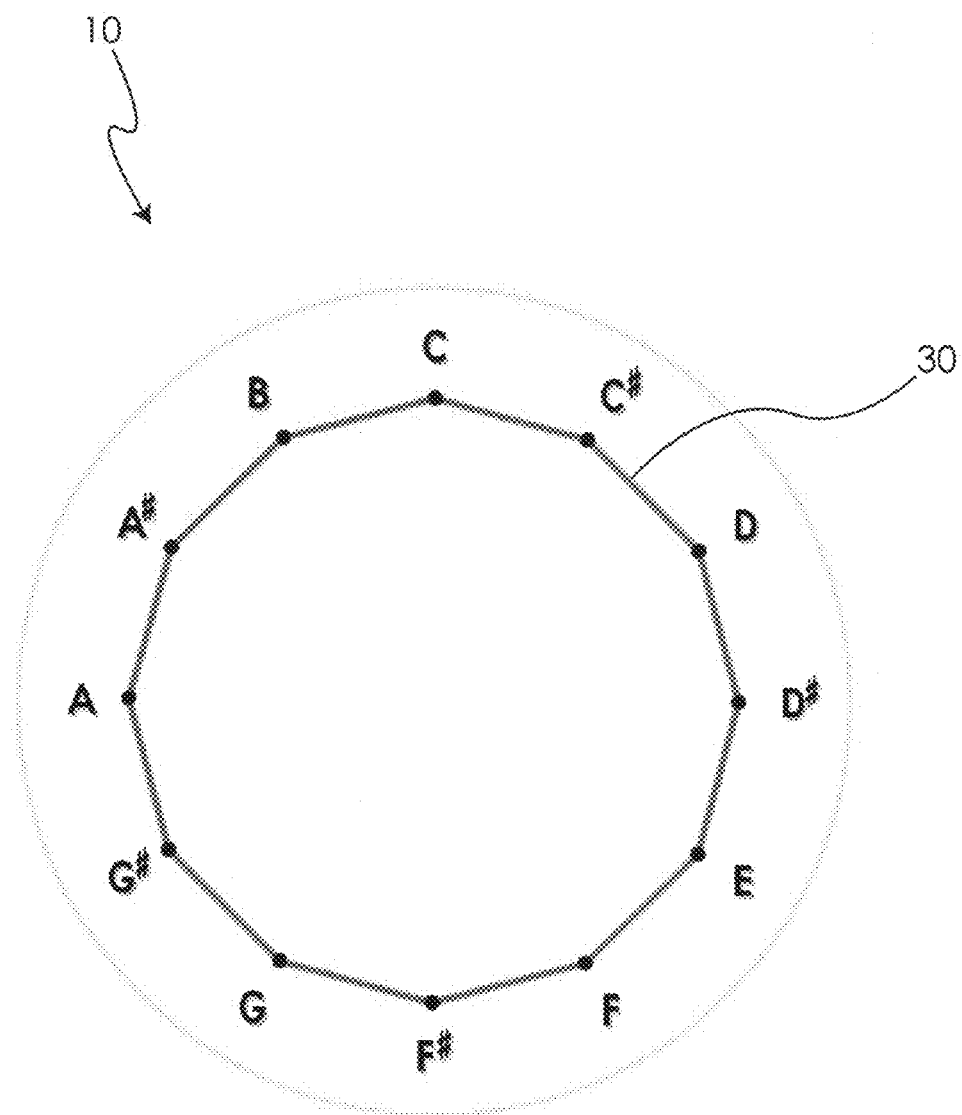
FIG. 3 is a diagram of a twelve-tone circle showing the chromatic scale.
Figure 4:
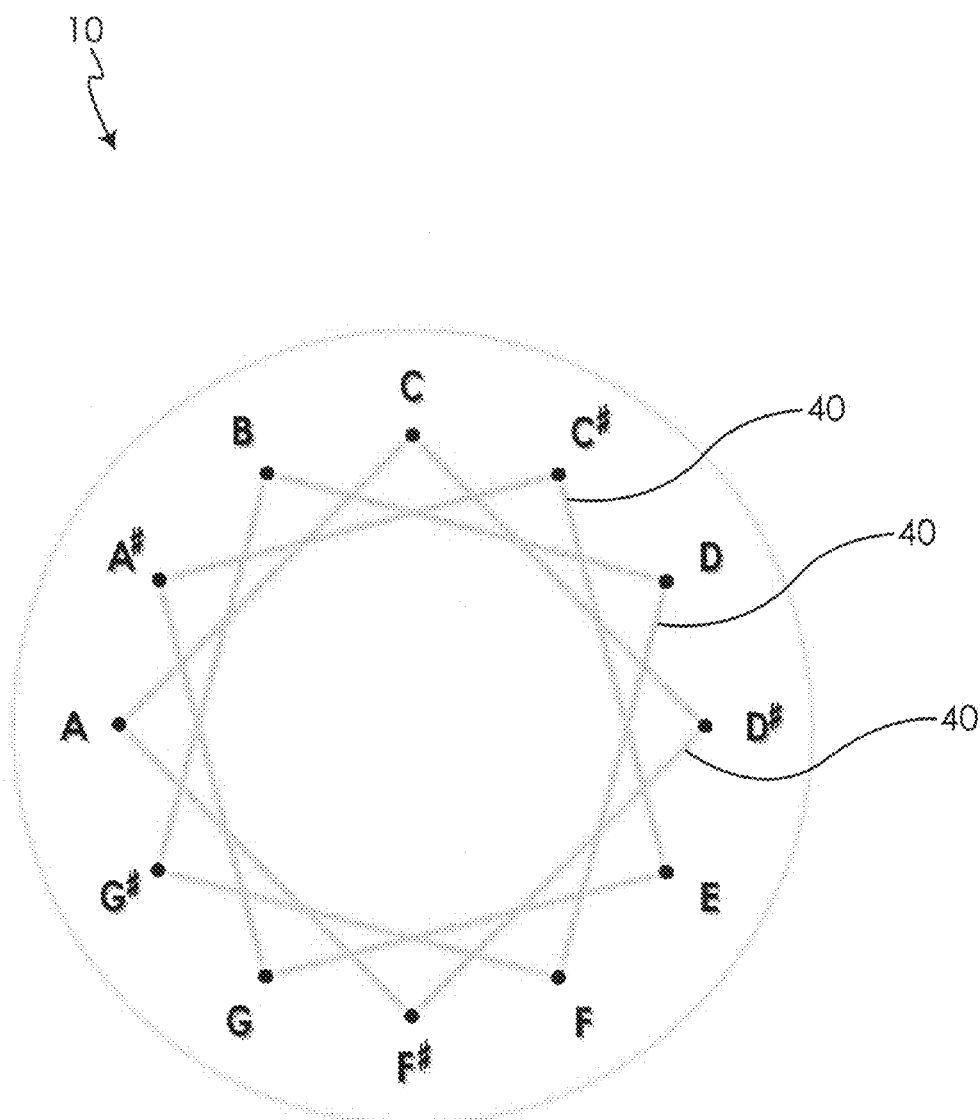
FIG. 4 is a diagram of a twelve-tone circle showing the first through third diminished scales.
Figure 5:
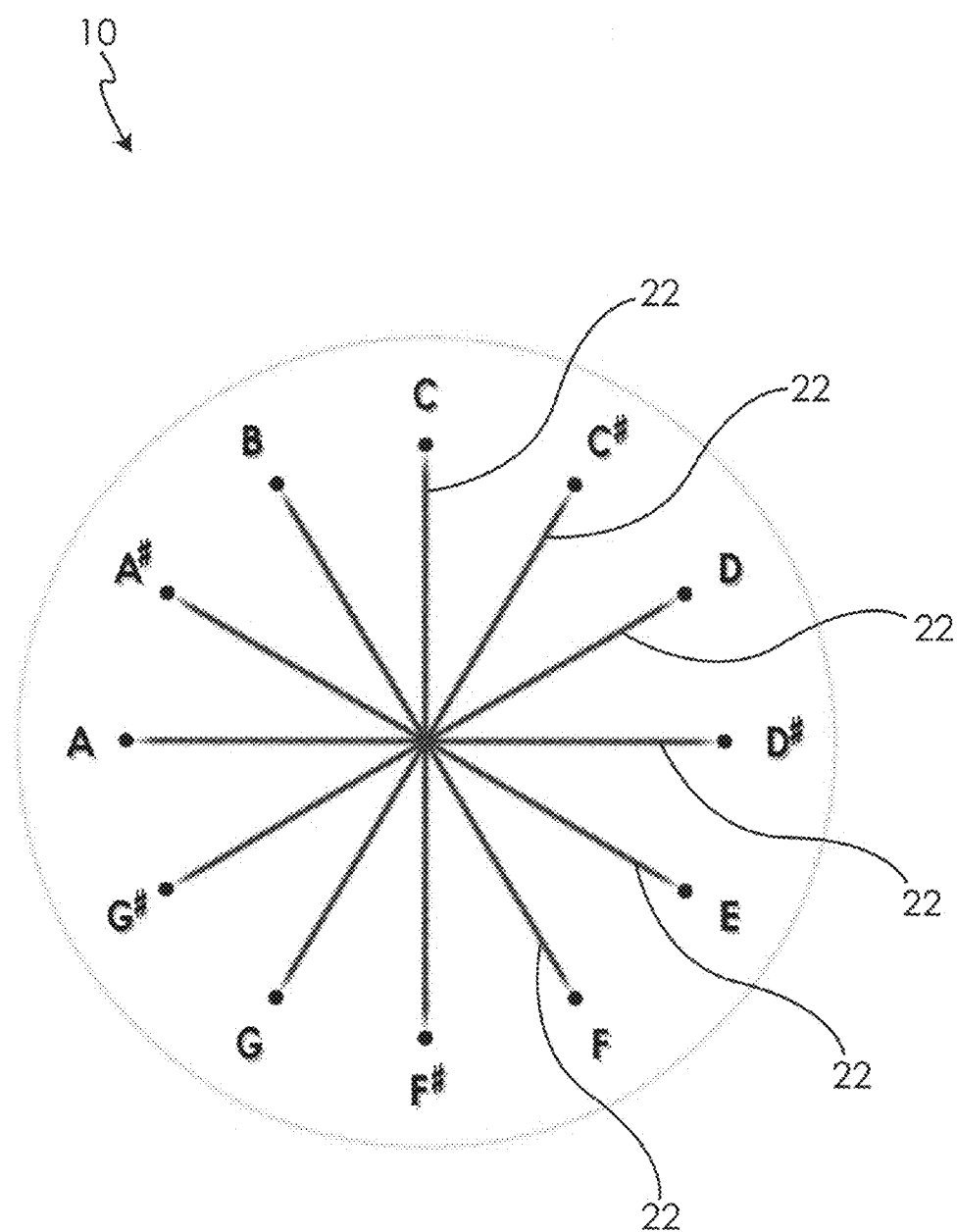
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
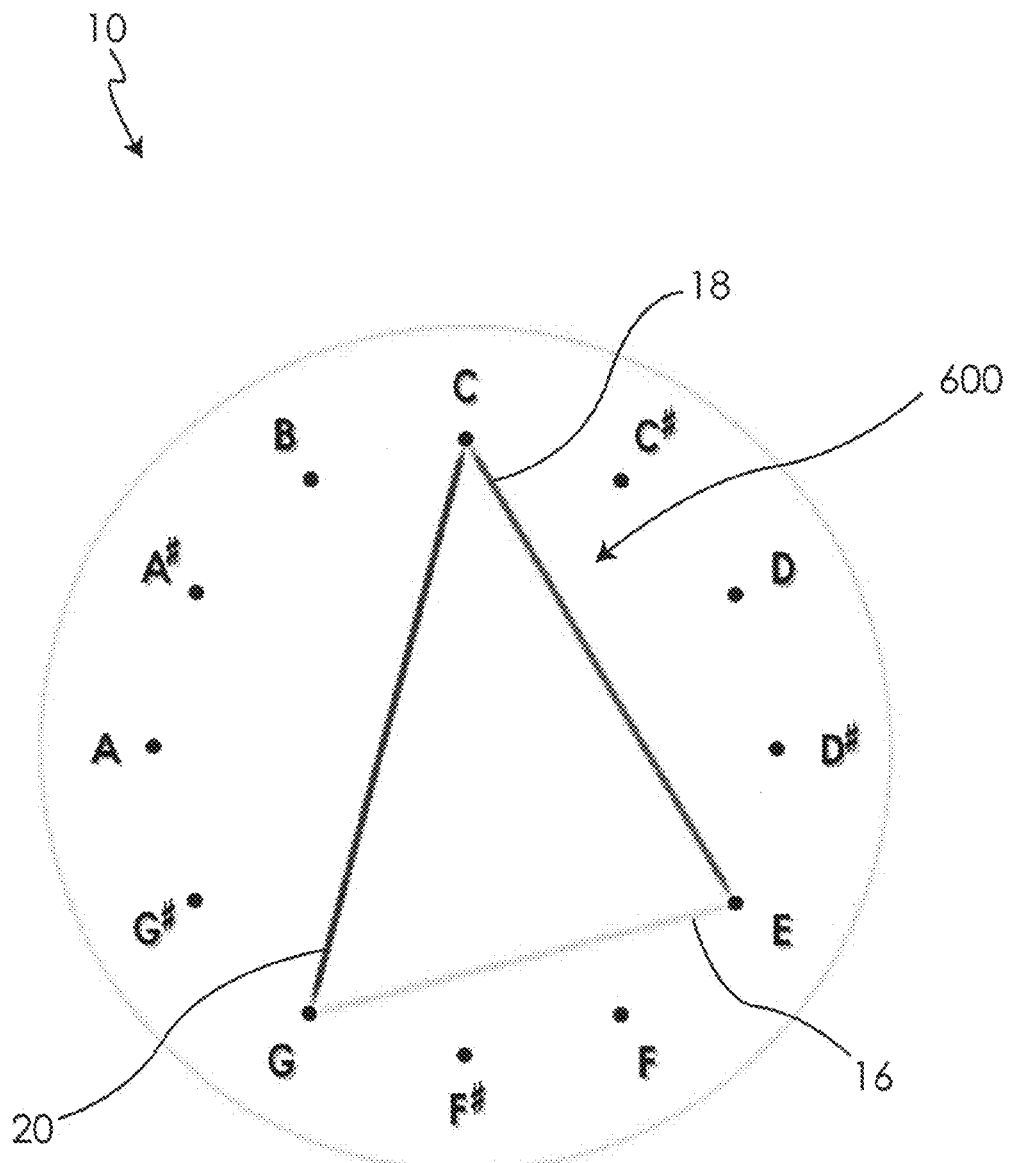
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
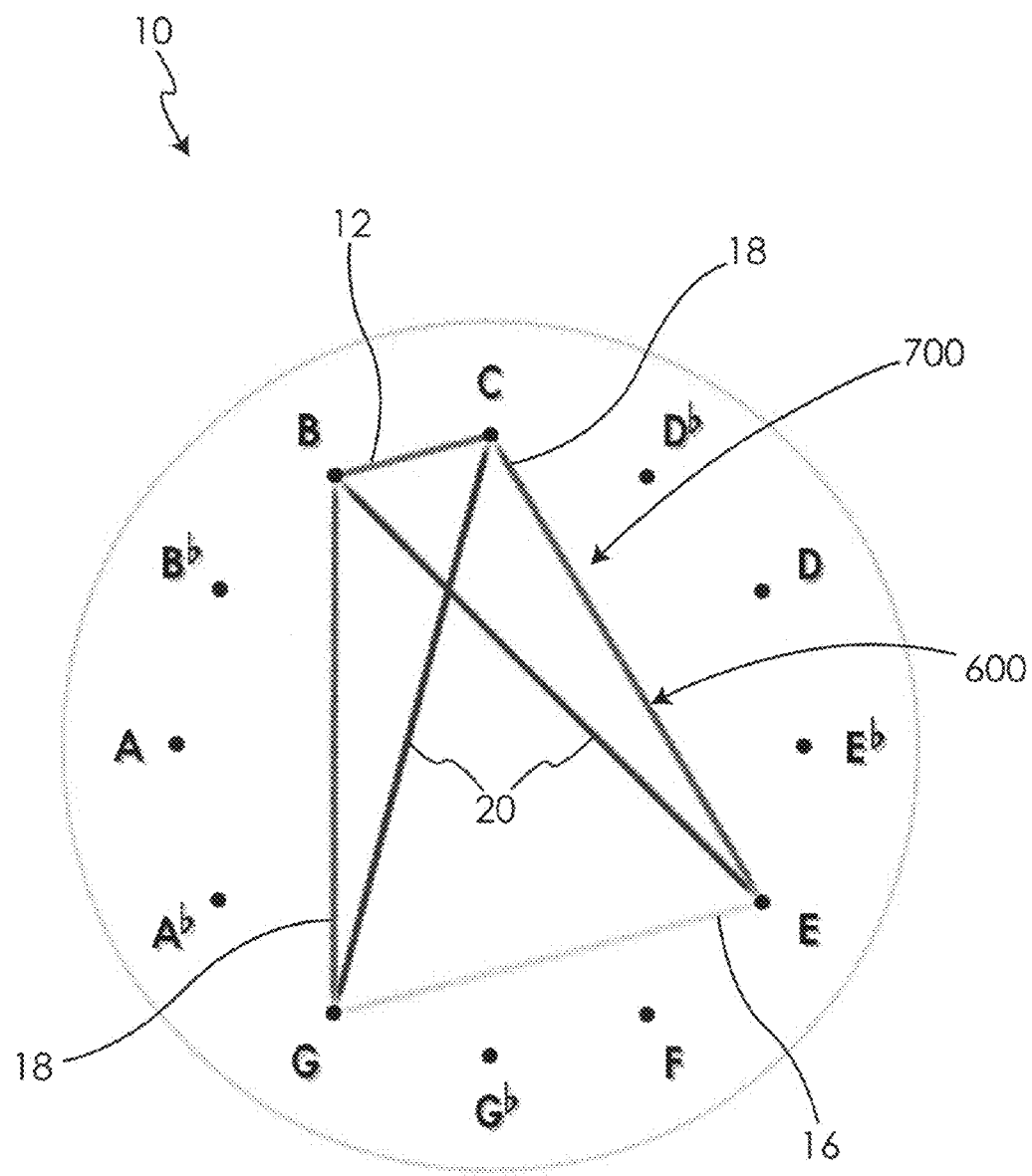
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
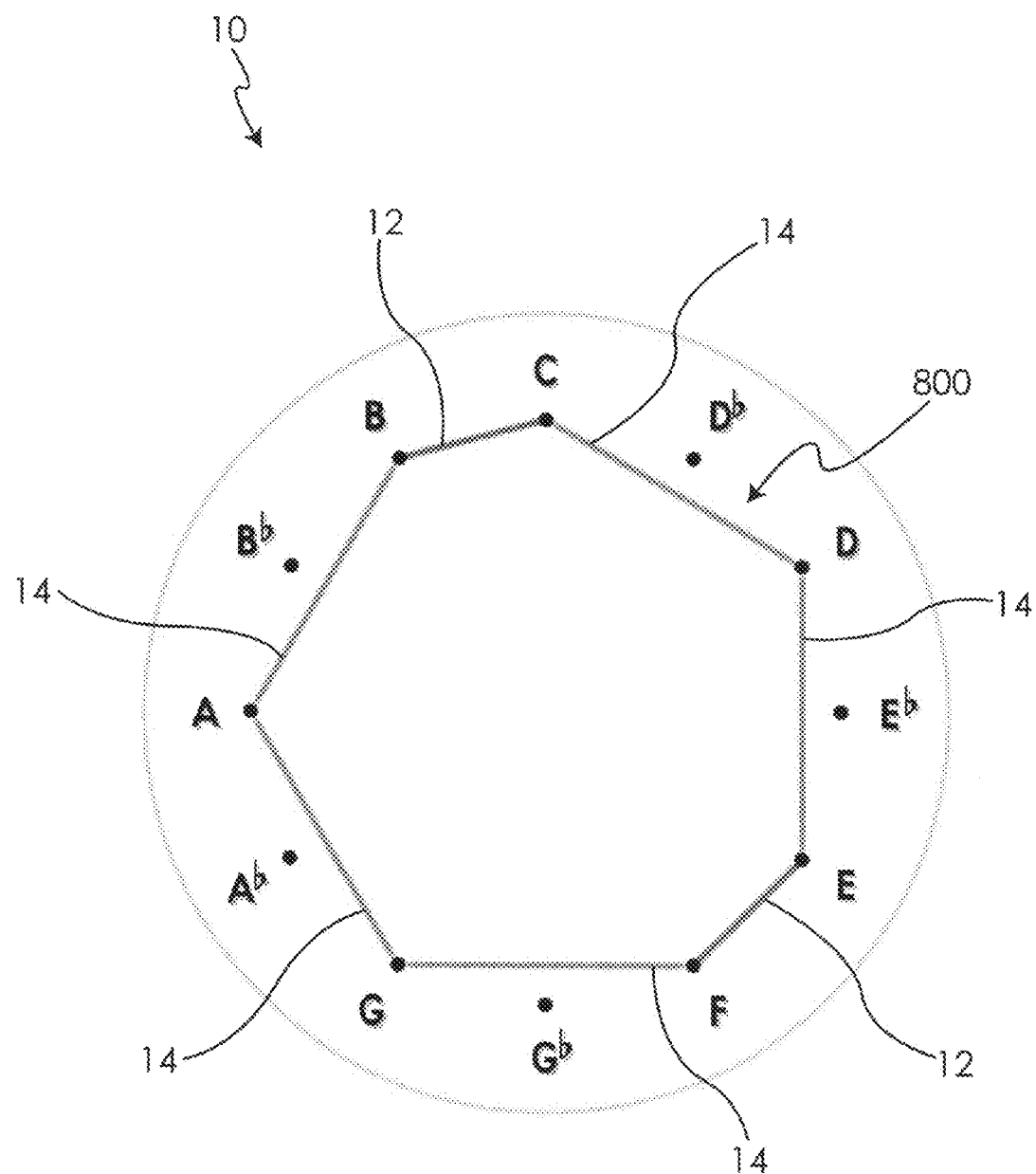
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
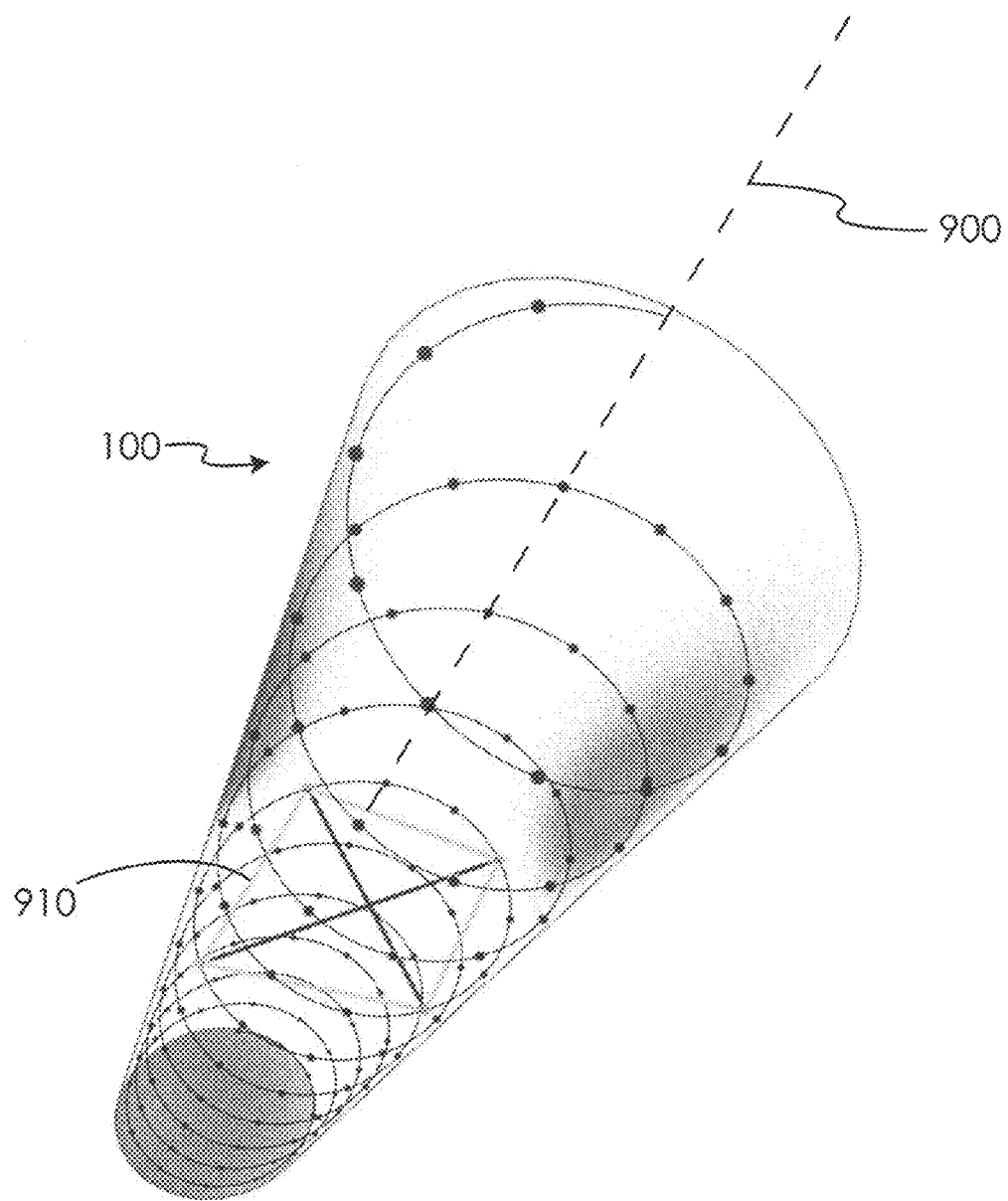
FIGS. 9-10 are diagrams of a helix showing a B diminished seventh chord.
Figure 10:
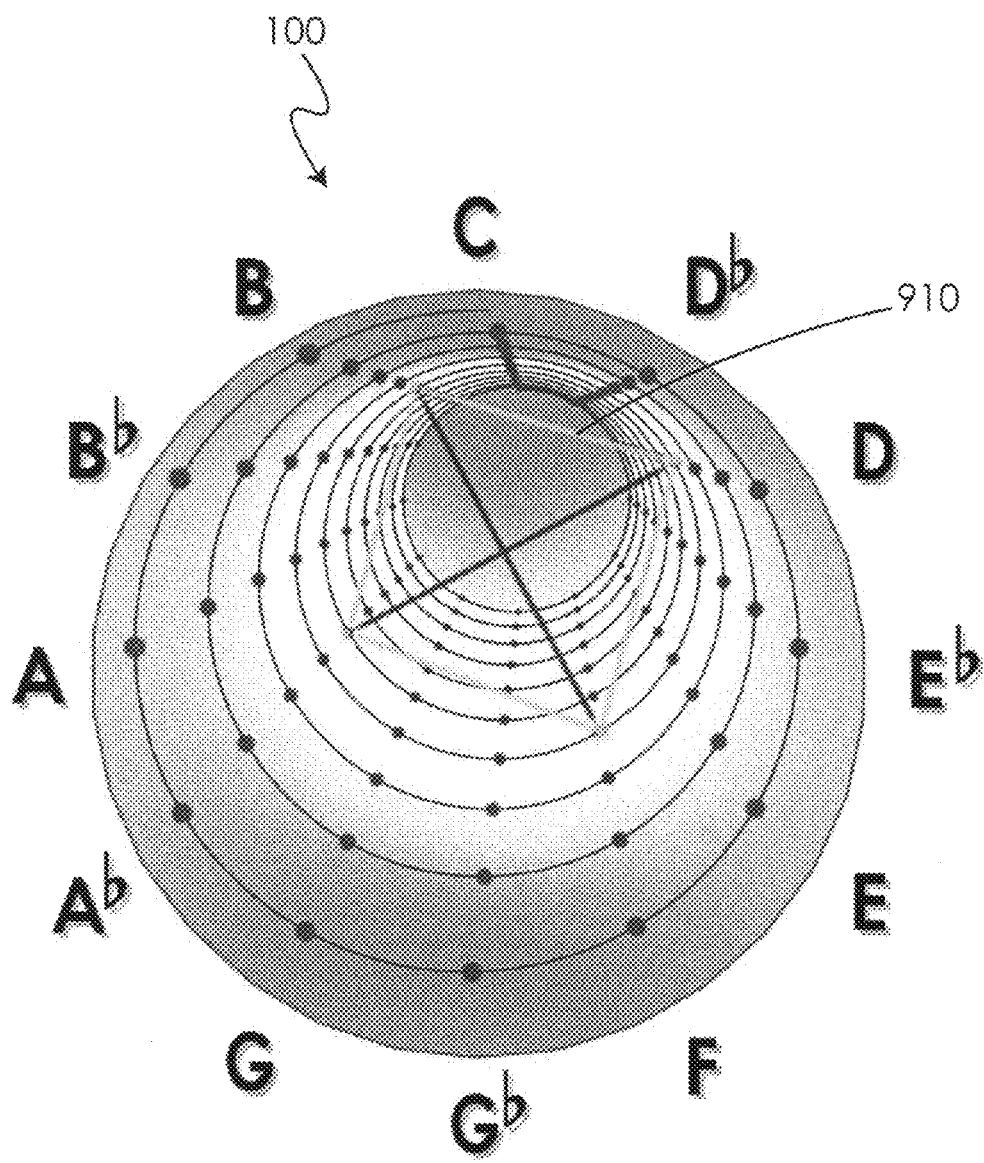

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
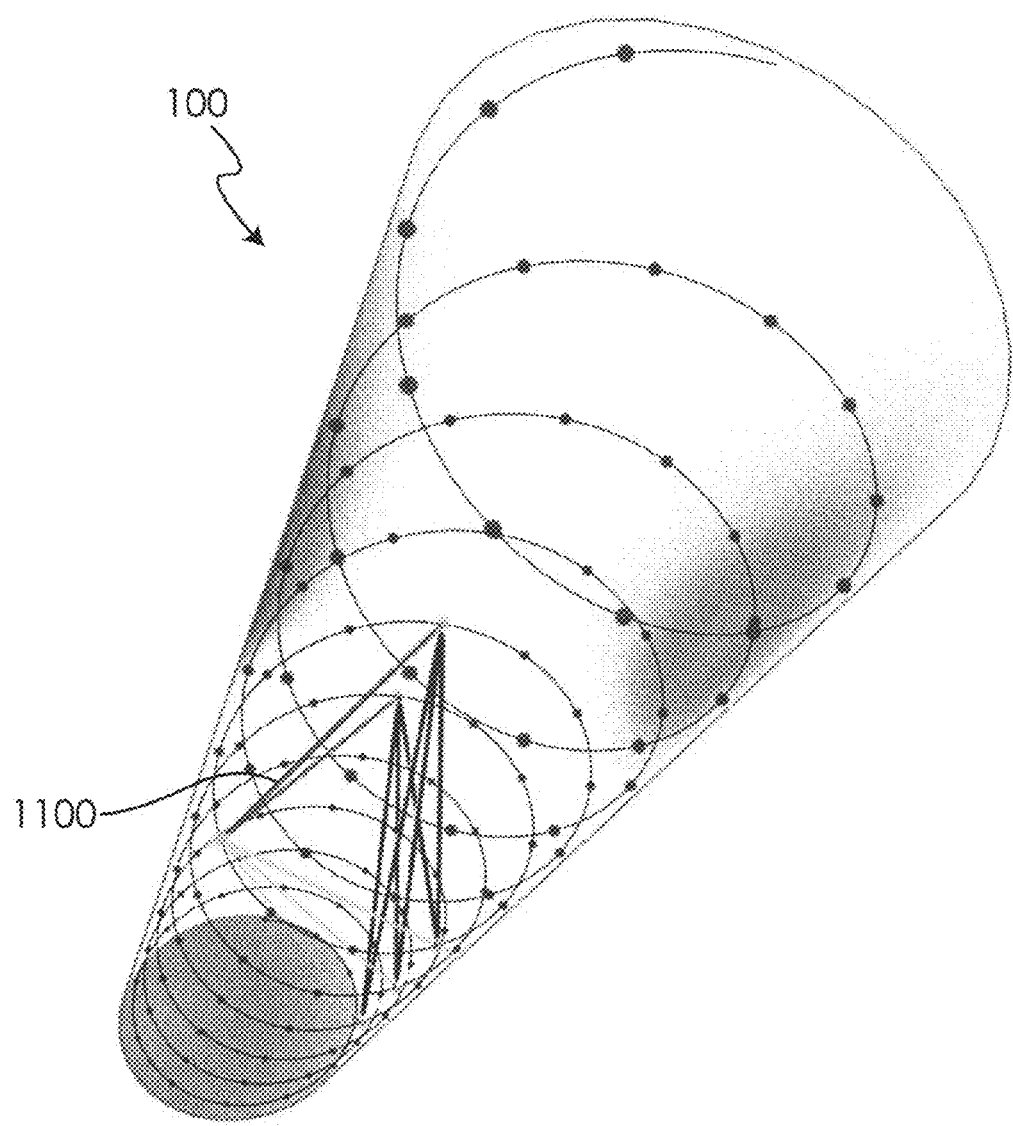
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 filed Jan. 31, 2008 entitled "Device and Method for Visualizing Musical Rhythmic Structures" which is also hereby incorporated by reference.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
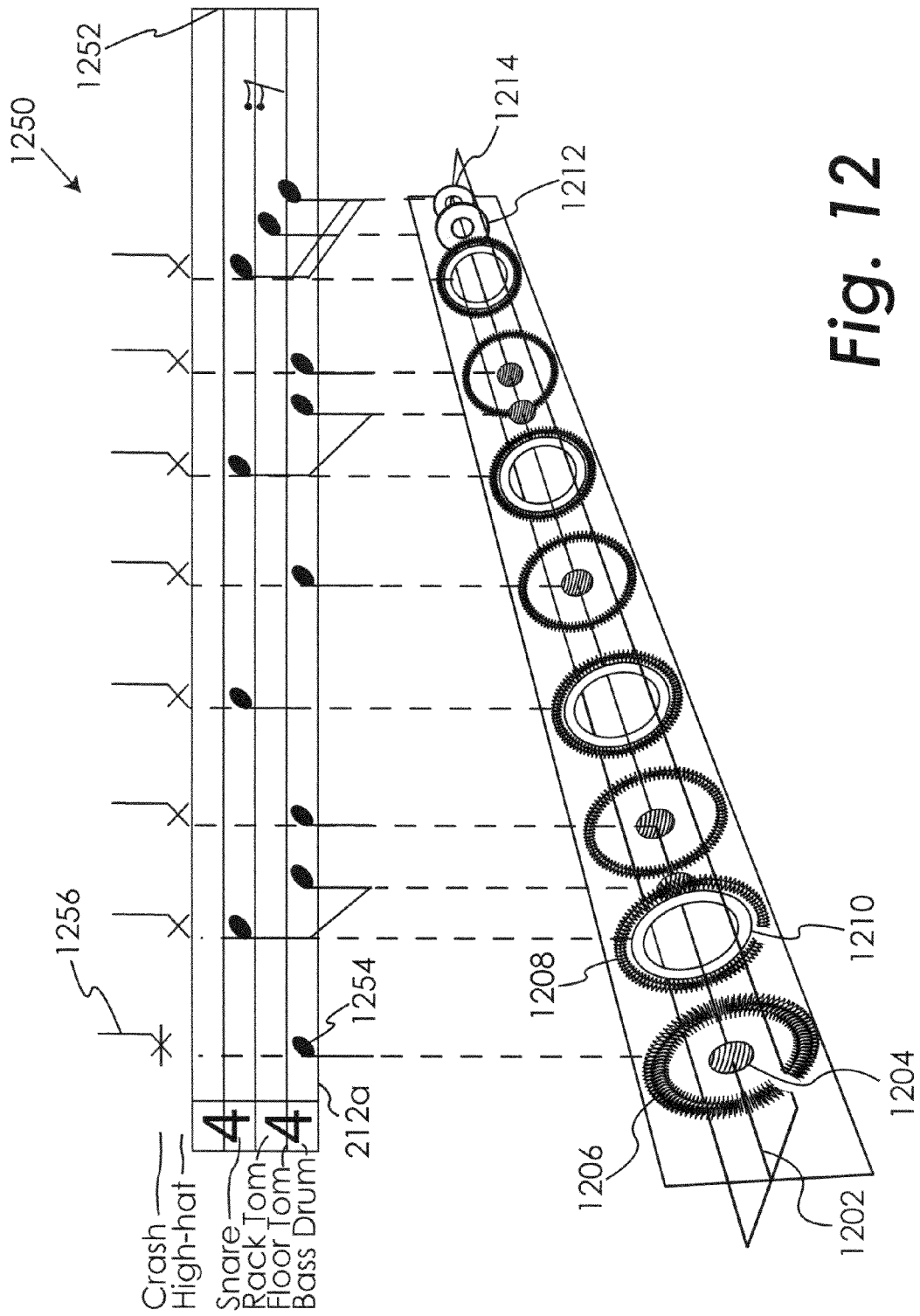
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
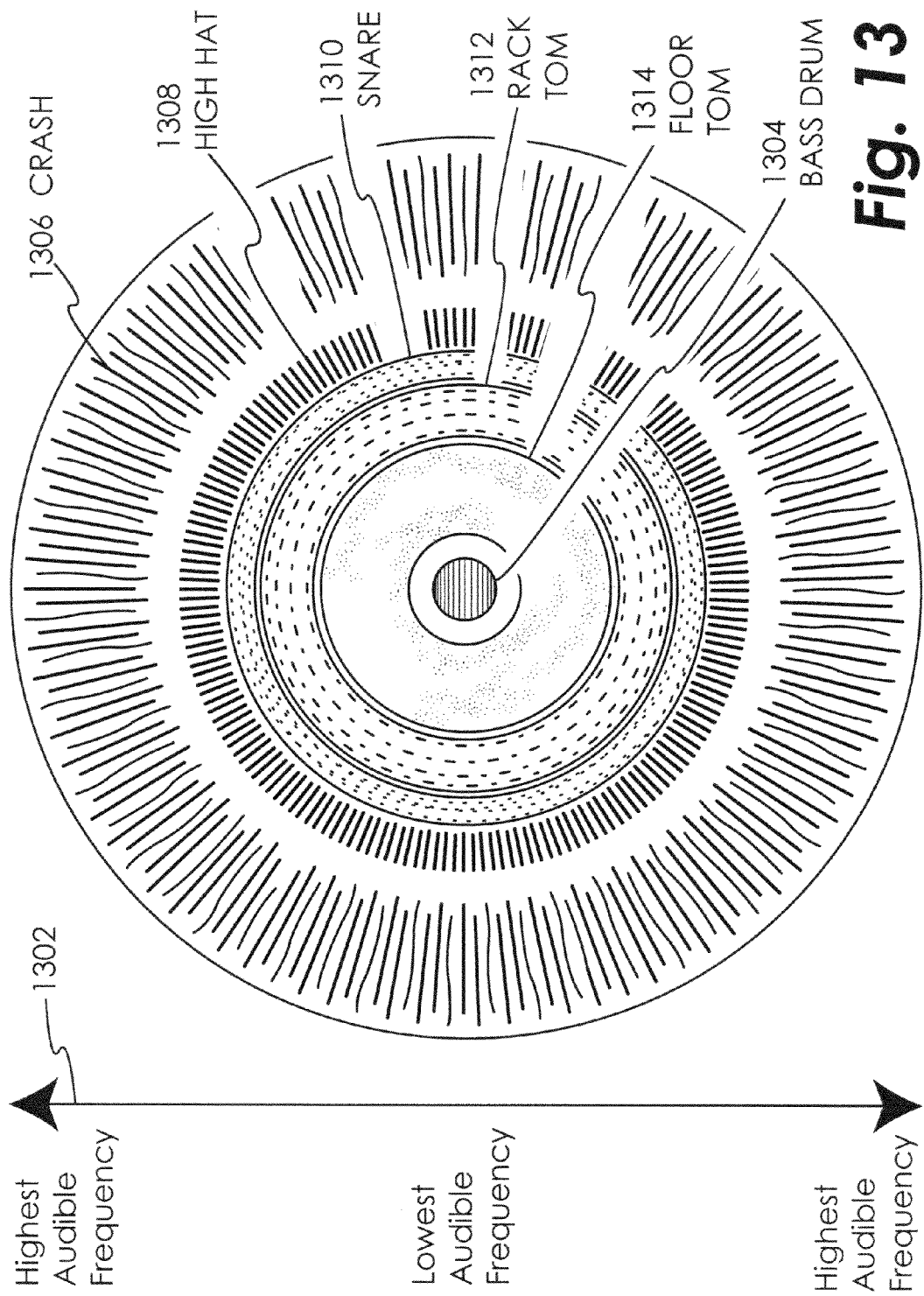
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
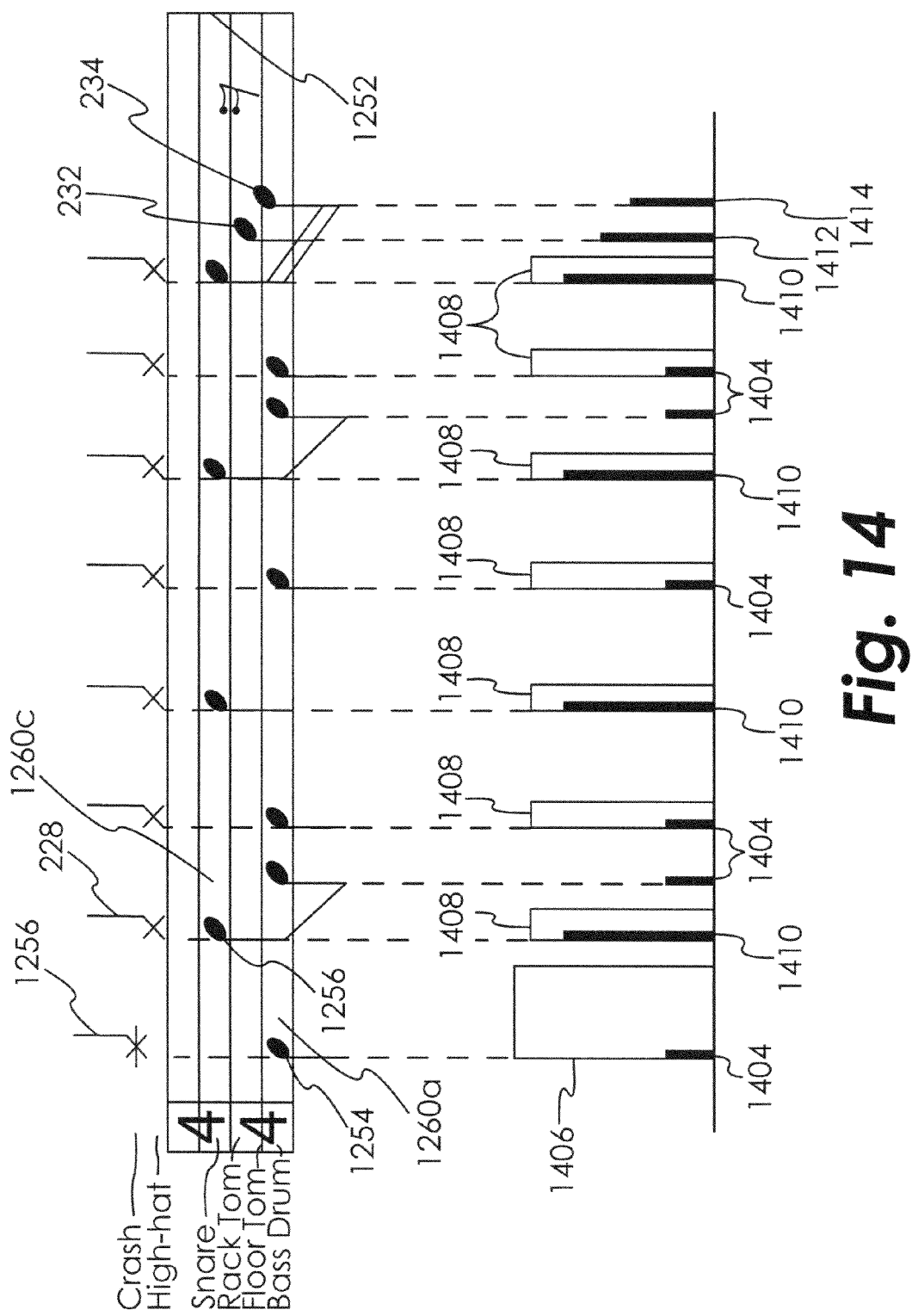
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260*a* of staff 1252. Likewise, bar 1410 (representing the snare drum) will be converted to a note 1256 in the second highest space 1260*c* of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

The present disclosure utilizes the previously described visualization methods as the basis for a system of musical instruction, appreciation and performance. The easily visualized note and chord shapes and mathematically efficient tonal progressions set out a logical step-by-step method for learning the underlying theory of diatonic music. The use of the unique twelve-note tonal circle diagrams permits an easily understood pattern of note-to-interval-to-chord progression that, through the use of visual shapes and color, immediately reinforce what a student has learned. Musical passages or songs can be written using a series of tonal circles rather than traditional notes on a staff to aid students in learning proper finger placement to play particular notes or chords on a piano, for example. Pieces of music can be chosen that visually teach and lead to the mastery of certain types of chords or scales, e.g., the family of augmented chords. Being able to visually associate a particular chord or note combination with a particular shape and colors greatly aids in learning the relationship between notes, intervals, and chords. This relationship is not intuitive or at all clear when music is learned in the traditional "notes on a staff" manner, but becomes apparent and understandable with the unique system of the present disclosure. Lessons or songs within the instructional system can be arranged such that playing certain songs in a particular order can focus on certain note or chord patterns to act as a practice or refresher exercise for beginners or accomplished musicians. The instructional system can be provided as printed materials or in a more interactive electronic form.

Figure 15:
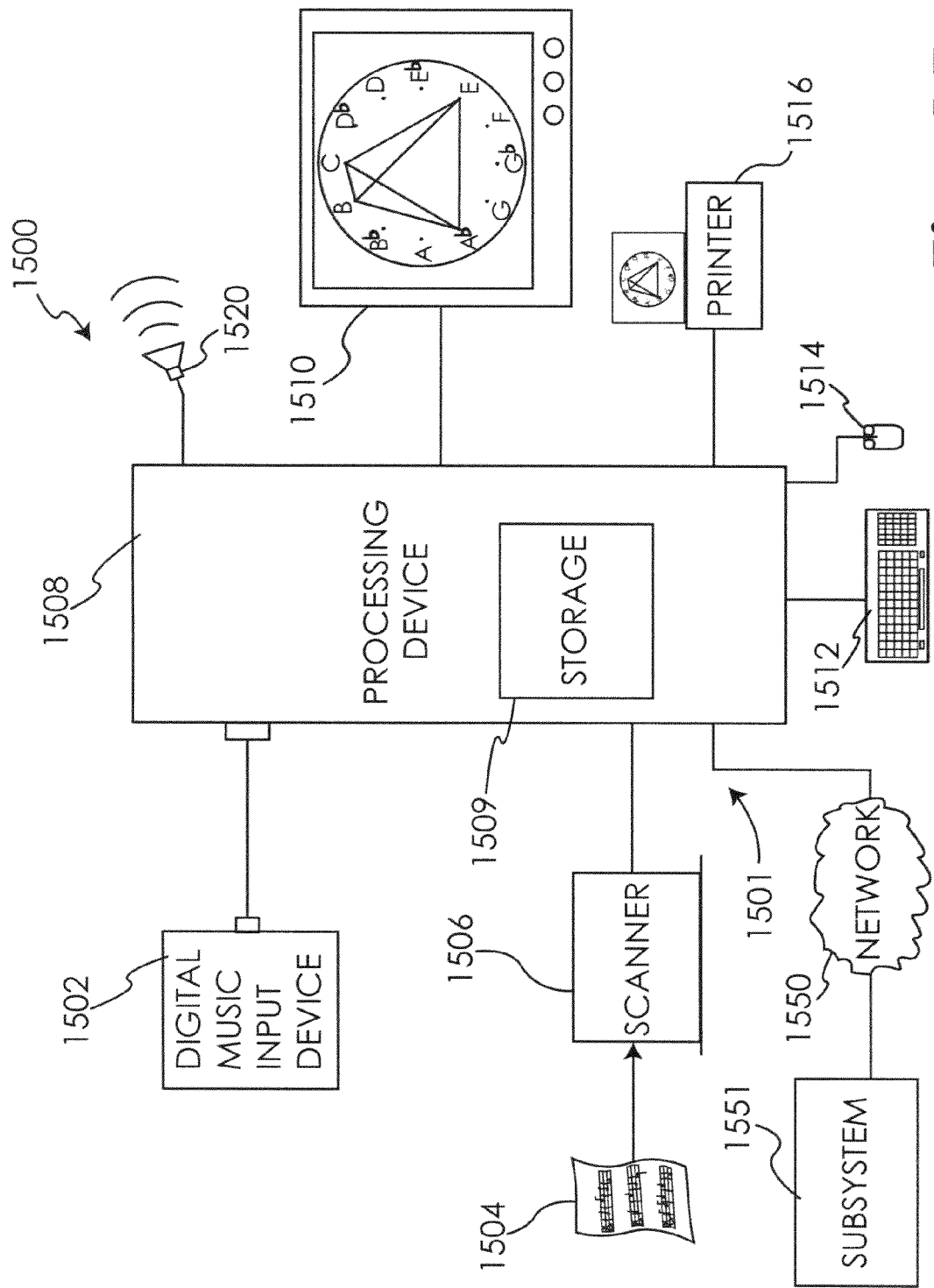
FIG. 15 is a schematic block diagram showing a music and sound education system according to one embodiment.

FIG. 15, shows, in schematic form, one embodiment of a music instruction system 1500 according to the present disclosure. The system 1500 may include a first subsystem 1501 including a digital music input device 1502, a sheet music input device 1506 for inputting sheet music 1504, a processing device 1508, data storage device 1509, a display 1510, user input devices such as keyboard 1512 and mouse 1514, a printer device 1516 and one or more speakers 1520. These devices are coupled to allow the input of music or other sounds, and the input of musical notation or other sound notation, into the processing device 1508 so that the music or sounds may be produced by the speaker 1520 and the visual representations of the music or sounds may be displayed, printed or manipulated by users.

The digital music input device 1502 may include a MIDI (Musical Instrument Digital Interface) instrument coupled via a MIDI port with the processing device 1508, a digital music player such as an MP3 device or CD player, an analog music player, instrument or device with appropriate interface, transponder and analog-to-digital converter, or a digital music file, as well as other input devices and systems. As one non-limiting example, a keyboard with a MIDI interface may be connected to the processing device 1508 and the diagrams discussed herein may be displayed on the display 1510 as the keyboard is played. As another non-limiting example, a traditional analog instrument may be sensed by a microphone connected to an analog-to-digital converter.

In addition to visualizing music played on an instrument through a MIDI interface, the system 1500 can implement software operating as a musical note extractor, thereby allowing the viewing of MP3 or other digitally formatted music. The note extractor examines the digital music file and determines the individual notes contained in the music. This application can be installed in any MP3 or digital music format playing device that also plays video, such as MP3-capable cell phones with video screens and MP3-based gaming systems like PSP. The structure of musical compositions from the classical masters to today's popular bands can then be visualized as the user listens to the music. The note extraction methods are described in U.S. patent application Ser. No. 61/025,374 filed Feb. 1, 2008 entitled "Apparatus and Method for Visualization of Music Using Note Extraction" which is hereby incorporated by reference.

The processing device 1508 may be implemented on a personal computer, a workstation computer, a laptop computer, a palmtop computer, a wireless terminal having computing capabilities (such as a cell phone having a Windows CE or Palm operating system), a game terminal, or the like. It will be apparent to those of ordinary skill in the art that other computer system architectures may also be employed.

In general, such a processing device 1508, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 1510 is coupled to the bus for displaying information for a computer user and the input devices 1512, 1514 are coupled to the bus for communicating information and command selections to the processor. A mass storage interface for communicating with data storage device 1509 containing digital information may also be included in processing device 1508 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display 1510 may be a liquid crystal device (LCD), a cathode ray tube (CRT), a plasma monitor, a holographic display, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 1509 may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device 1509 using the mass storage interface and downloads this information into random access memory for execution. The processor then executes an instruction stream from random access memory or read-only memory. Command selections and information that is input at input devices 1512, 1514 are used to direct the flow of instructions executed by the processor. Equivalent input devices 1514 may also be a pointing device such as a conventional trackball device. The results of this processing execution are then displayed on display device 1510.

The processing device 1508 is configured to generate an output for viewing on the display 1510 and/or for driving the printer 1516 to print a hardcopy. Preferably, the video output to display 1510 is also a graphical user interface, allowing the user to interact with the displayed information.

The system 1500 may optionally include one or more subsystems 1551 substantially similar to subsystem 1501 and communicating with subsystem 1501 via a network 1550, such as a LAN, WAN or the internet. Subsystems 1501 and 1551 may be configured to act as a web server, a client or both and will preferably be browser enabled. Thus with system 1500, remote teaching and music exchange may occur between users.

Figure 16:
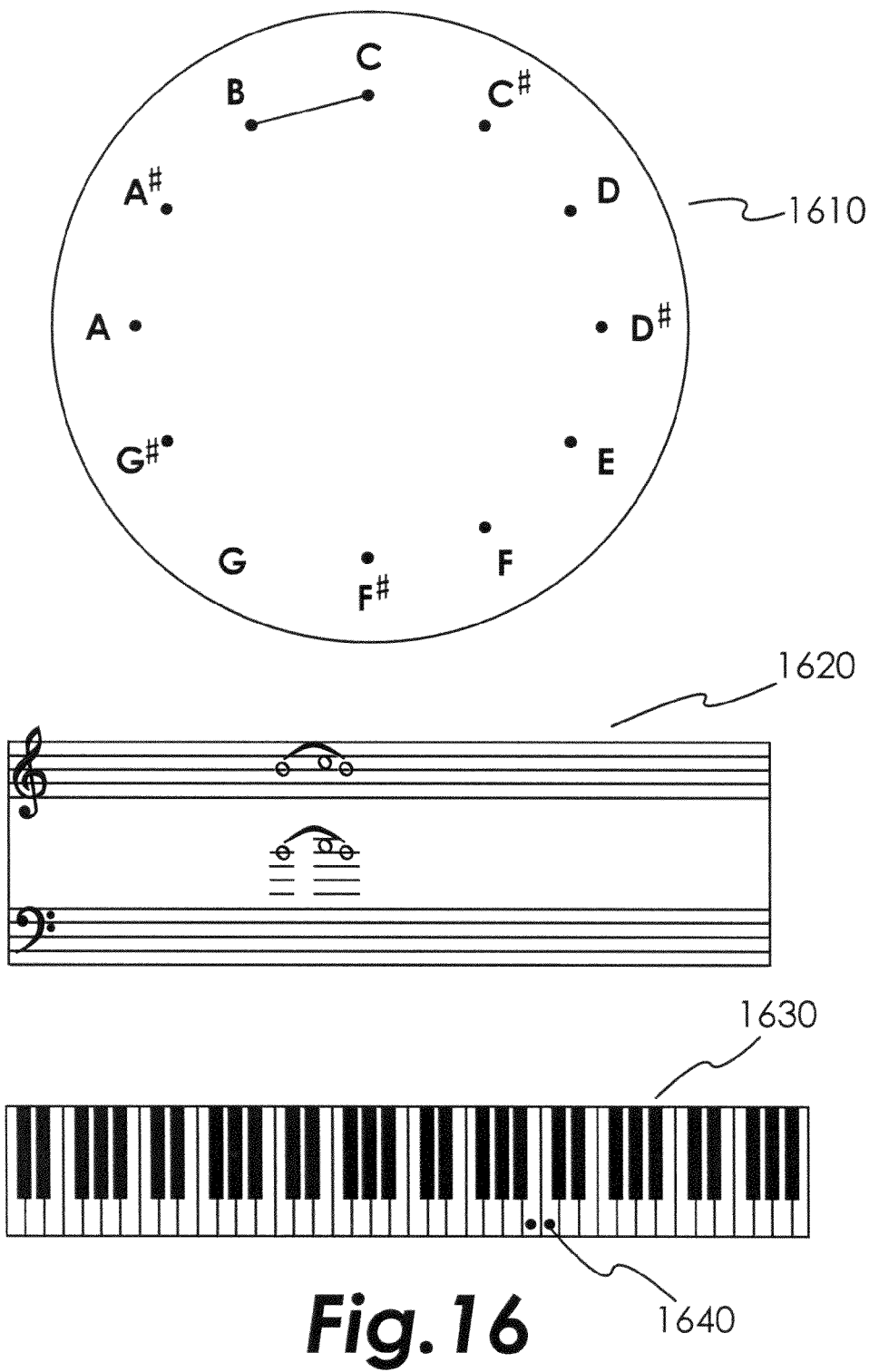
FIG. 16 is an example of a screen layout including both traditional staff notation and a tonal visualization according to one embodiment.
Figure 17:
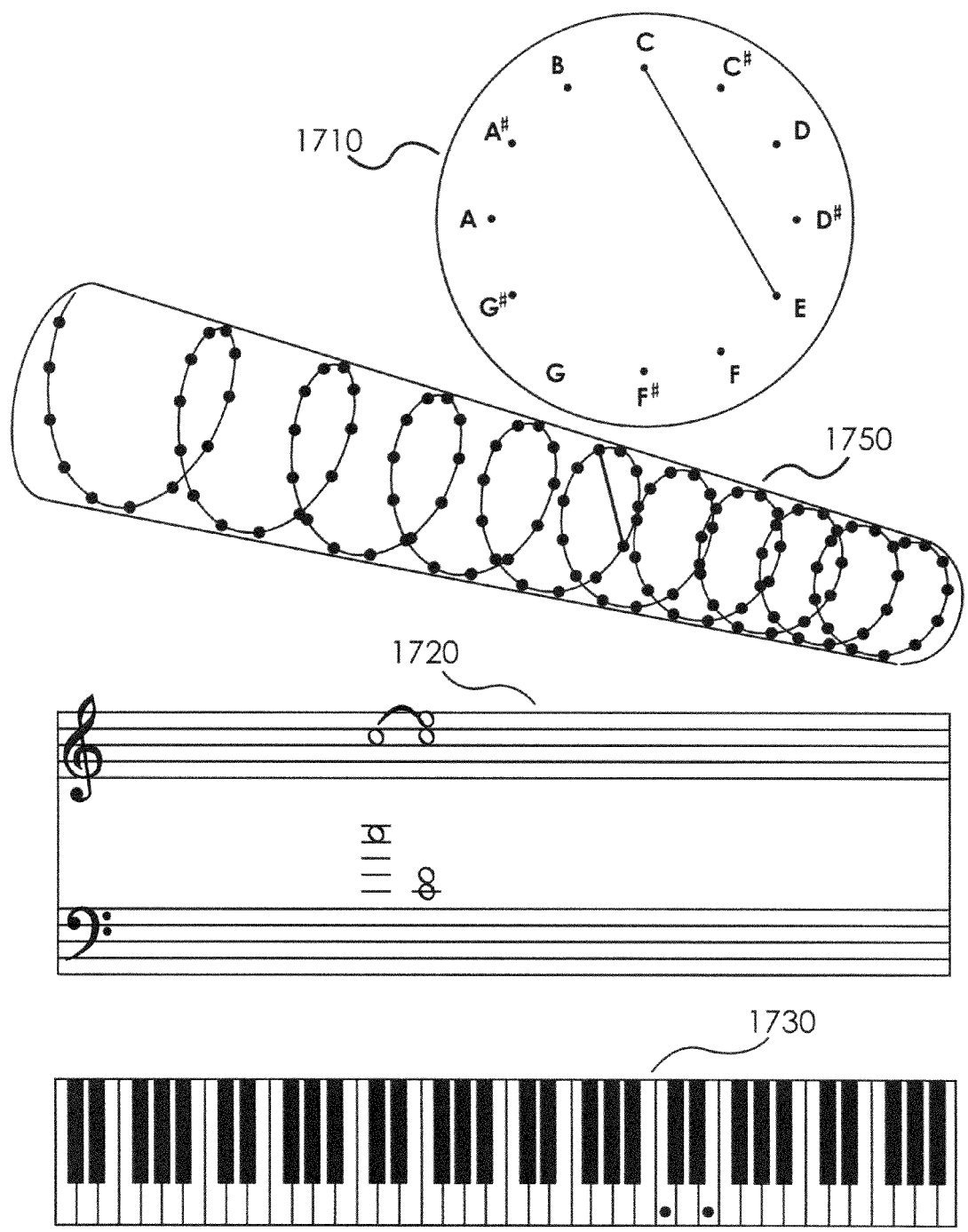
FIG. 17 is an example of a screen layout including both two and three dimensional visualizations according to one embodiment.

The system 1500 is able to provide visualizations of the tonal and rhythmic components of the inputted musical information on display 1510. In one embodiment, the visualizations are generated in real time as the user plays in instrument or as the input source is read by the system. In another embodiment, the visualizations are based on prerecorded information, such as compositions previously made or purchased by the user. If desired, the user may select various types of visualizations to be displayed for comparison purposes. For example, as shown in FIG. 16, the user can view tonal visualizations 1610 (according to the one method of the present disclosure) along with traditional staff notation 1620. In addition, an instrument view 1630, shown here as a piano, can be displayed to aid the user in understanding which physical control elements on the instrument correspond to the various visual representations (it will be appreciated that the present disclosure comprehends the display of a visual representation of any type of instrument). Such control elements may include, but are not limited to, keys on a piano, holes or buttons on a wind or brass instrument, pedals or individual drum or percussion elements in a drum kit, finger positions on a violin, slide positions on a trombone, and any other physical requirement for producing a particular note or group of notes on an instrument. Key press indicators 1640 are included which correspond to the notes displayed in visualization 1610 and traditional staff notation 1620. The key press indicators 1640 may be displayed in response to live input from an instrument being played by a user or activated by the system to tell the user which keys to depress to sound a given note or group of notes. For example, when the user depresses a "B" and "C" key on a MIDI piano connected to the system 1500, key press indicators 1640 are displayed on the corresponding keys of the instrument view 1630, as shown in FIG. 16. In addition, the same notes are displayed on staff notation 1620, along with a specific color line between the "B" and "C" positions on tonal visualization 1610. Likewise, the system 1500 can be configured to display the key press indicators 1640 for the "B" and "C" notes on instrument view 1630 as prompts for the user to play the notes on the actual instrument. It shall be understood that multiple forms of tonal and rhythmic visualizations can be simultaneously displayed, with the particular types and groupings selectable by the user. To illustrate this, FIG. 17 shows an instrument view 1730, traditional staff notation 1720, two-dimensional tonal representation 1710, and three-dimensional tonal representation 1750.

Figure 18:
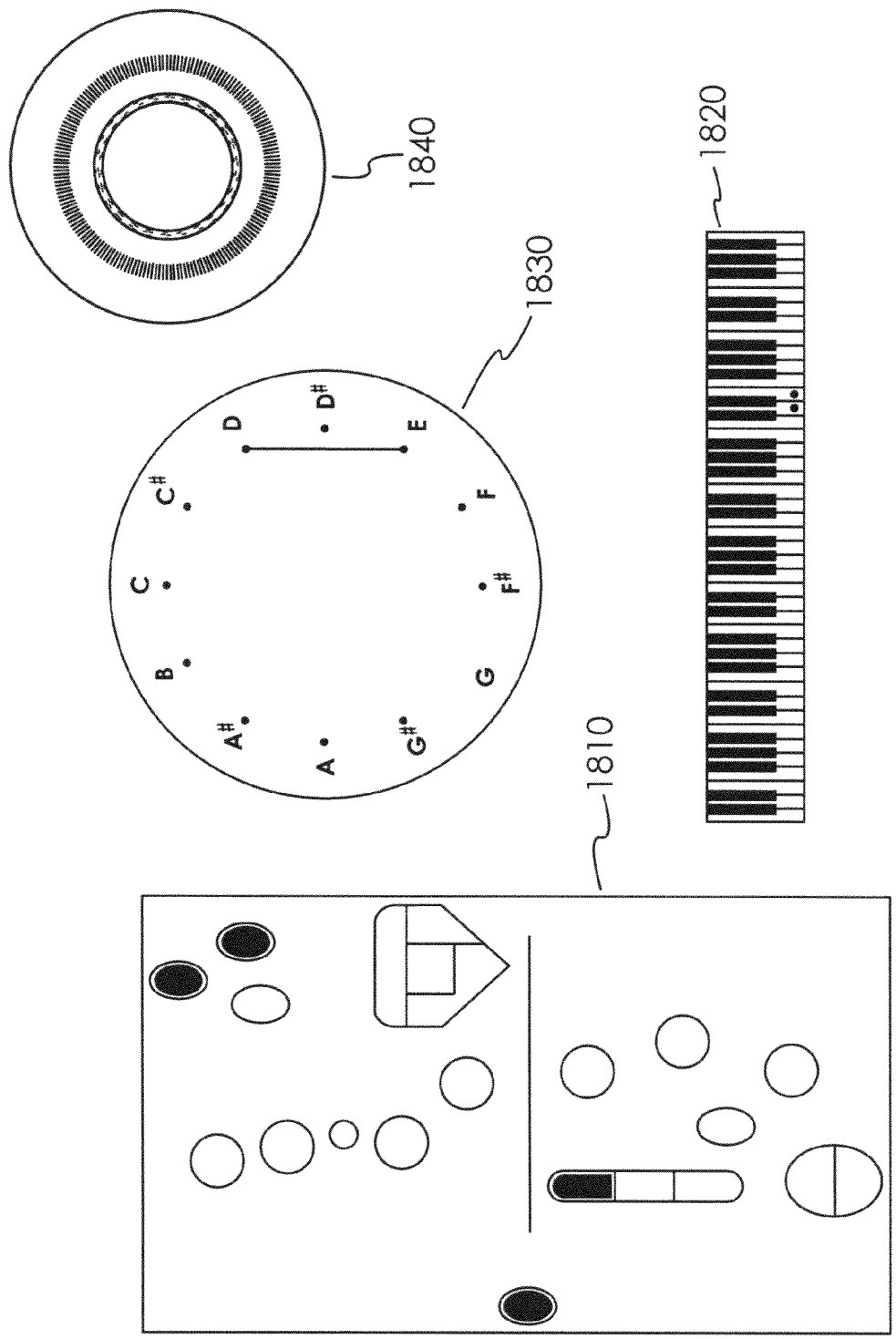
FIG. 18 is an example of a screen layout including tonal visualization, rhythmic visualization, and multiple instrument views according to one embodiment.
Figure 19:
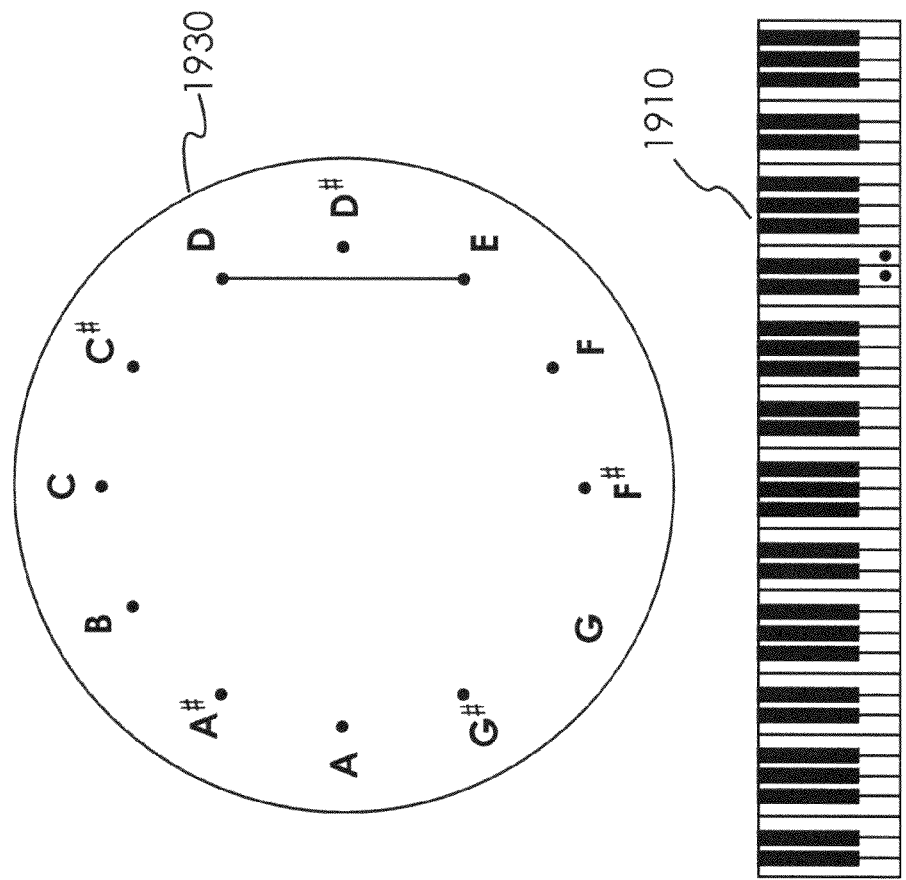
FIG. 19 is an example of a screen layout including independent instrument views with corresponding tonal and rhythmic visualizations according to one embodiment.
Figure 19:
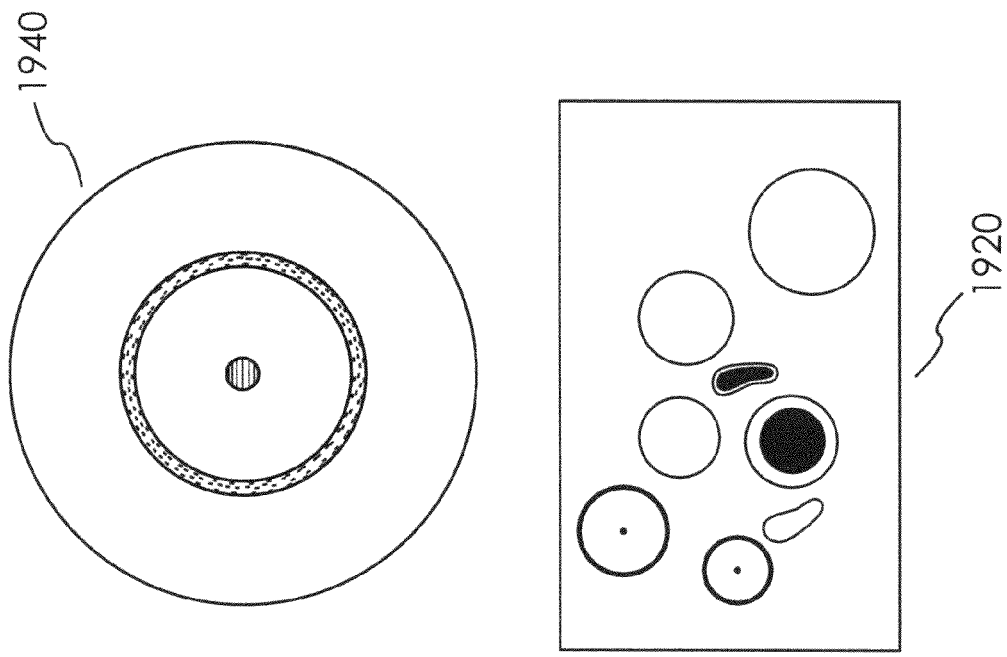

In addition to multiple tonal or rhythmic visualizations for a single instrument, visualizations for multiple instruments may also be displayed together. This will be particularly helpful to users who are proficient in one instrument, but want to learn an additional instrument. For example, a user who wishes to use their basic knowledge of piano as a reference while learning the saxophone could select both instrument views. In one embodiment, the two instruments can be "tied" together, whereby pressing the physical keys of one instrument causes the corresponding note indicators to appear on the visual depiction of another instrument in addition to the visualizations of the present disclosure. FIG. 18 shows such an arrangement, including saxophone view 1810, piano view 1820, two-dimensional tonal visualization 1830 and rhythm visualization 1840. In other embodiments, the instruments and their corresponding visualizations may operate independently of one another. For example, FIG. 19 shows both a piano instrument view 1910 and a drum kit instrument view 1920, along with tonal visualization 1930 corresponding to the piano, and rhythm visualization 1940 corresponding to the drum kit. This configuration is useful when music visualizations for multiple instruments need to be synchronized, such as when teaching in a group setting. It shall be understood that any combination of instruments and visualizations may be displayed simultaneously to the user.

In certain embodiments, the instructor or user is able to manipulate the traditional musical notation and see the effect on the visualization of the present disclosure. Likewise, the user may manipulate the visualization of the present disclosure and see the resulting effect on the traditional musical notation. In further embodiments, the user can make adjustments to a note or group of notes in traditional musical notation using the pointing device, keyboard, or other user input device, whereby the system will automatically make proportional adjustments to the rest of the composition (or, alternatively, to a portion of the remainder of the composition selected by the user). For example, if the user selects a whole note and changes it to a half note, the duration of other notes and rests in the composition will also be cut in half. This concept can be applied to other musical properties of the composition such as, but not limited to, changes in time signature or "meter," dynamic or loudness levels, or transpositions in key signatures.

To further enhance teaching in full orchestra or band settings, the system 1500 will allow the user to copy the assigned composition for one instrument to another instrument. For example, the part being played by a flute can be copied by a piccolo, and later customized for enhanced effect. In further embodiments, the system will automatically transpose a copied melody to an appropriate octave. For example, if the user copies a melody from a cello to a violin, the system will automatically transpose the melody to a higher octave within the playable range of the violin. In still further embodiments, the user can assign one instrument to play a specified harmony of a melody being played by another instrument. The system will then assign notes to the harmony instrument, taking into account the various sharps and flats within the key signature of the composition. The system will also take into account any key signature changes that occur during the composition.

The present disclosure contemplates that a music student may purchase music instruction or lessons pre-programmed on electronic storage media, with or without printed materials. The program or software, accessed by processing device 1508 via data storage device 1509, for example, will then provide a step-by-step process for learning music theory, as well as learning to play an instrument, using the previously described understandable tonal and rhythm visualization systems. The program or software will provide tonal and rhythm visualization for the student, and the program can be configured to provide both the visualization of the note, chord, musical passage, or rhythm pattern that the student was supposed to play, as well as the note, chord, passage, or pattern that was actually played by the student. Through the use of this real-time visual feedback, a student can immediately determine both visually, and aurally, that a mistake was made. The correction that is required to be made in order to play the music properly is also evident from the visualization system, either by merely viewing the correct visualization shape, color, or pattern, or by hints or specific instruction to the student, e.g. "your left middle finger is incorrectly placed one note to the left."

The present disclosure also contemplates that system 1500 may incorporate a "shape filter," which will show a visualization of a particular musical shape using gray or dimly-lit lines. When the user sounds notes on the instrument that match tones in the shape, the points and lines representing those tones will change color or become otherwise accentuated to provide further visual reinforcement to the user that the correct notes are being played. The system 1500 can also be configured to only play "correct" notes. That is, notes pressed by the user that are not part of the chord or shape being taught will not be sounded or visually displayed. This prevents the user from being discouraged during the learning process and helps the user focus on the desired notes or shape.

The program or software can also maintain statistics relating to the user's accuracy rate and provide rewards for improved performance. The student's accuracy can be measured both in terms of actual correct notes in addition to timing accuracy. A metronome function can also be incorporated to help the student improve timing or rhythm accuracy. In certain embodiments, the system will keep track of which tonal and rhythmic shapes the user has mastered so that the user can make more efficient use of practice time, concentrating on areas of difficulty. The program or software can also be configured to require a certain level of skill or mastery of a subject or piece of music before allowing the student to continue to the next level or stage of instruction. The mastery level and statistical data for each user can be managed using unique user login information. When a user logs in, the system will be able to retrieve all of the data associated with that user. This will allow multiple users to utilize a single system as in a multi-use classroom environment or by accessing the software from an application service provider using the internet or other appropriate communications link. In addition, the user can save the current composition or recording session, along with all associated audio and visualization information, for later retrieval and editing.

The instruction software or program can be configured to include a complete instructional regimen, or be sold as individual programs that require the purchase of successive modules as the student progressed in expertise. Sales of the instructional modules can be through stores, by on-line sales, or through direct downloads of software, and proof of prior accomplishment can be required to purchase the next module in an instructional series, if such control is desired. Data storage device 1509 can also allow a student to record a song or musical piece for later review or to send to friends, relatives or a music publisher, for example.

Remote access to subsystem 1501 via network 1550 can provide help from an actual music instructor if a student needs additional help, or to demonstrate a level of accomplishment to enable advancement, for example. Access to an instructor may entail extra cost or a certain amount of instructor time may be included in the cost of the instruction programs or modules. Subsystem 1551, connected via network 1550, may also provide a source of instruction that can supplement or take the place of the previously described pre-programmed cards or modules, as well as a source of additional information, "extra credit" exercises or practice pieces, or the ability to purchase added components for system 1500 or other items. Downloads of the instructional software can also be available via subsystem 1551 and network 1550. In certain embodiments, a "virtual" instructor can be provided, such as computer generated voice, with or without a graphical human representation, which prompts the user through the various exercises. In other embodiments, the voice can be a recorded voice of an actual teacher. "Master classes" can also be provided, wherein accomplished or famous musicians present their personal musical technique, along with the tonal and rhythmic visualizations described above.

The system 1500 can also be implemented as a video gaming system in which musical instruction can be combined with video games to provide additional interest and enjoyment to learning music theory and performance, through the use of the tonal and rhythm visualization systems, disclosed herein. Games and interactive exercises can be included in the previously described pre-programmed modules as well. The games can award points based on performance of certain chord shapes or scales, and allow users to collaborate and play against each other remotely over a network. The use of games in connection with the visualization systems can be especially interesting for young or beginning students.

While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the disclosure provided herein are desired to be protected. The articles "a," "an," "said," and "the" are not limited to a singular element, and may include one or more such elements.

What is claimed:

1. A music instruction system, comprising:
    a processing device; and
    a display;
    wherein:
    said processing device executes computer readable code to create a first visual representation of musical information for output on said display; and
    wherein:
    said first visual representation is generated according to a method comprising The steps of:
    (a) labeling the perimeter of a circle with twelve labels corresponding to twelve respective notes in an octave, such that moving clockwise or counter-clockwise between adjacent ones of said labels represents a musical half-step;
    (b) identifying an occurrence in the musical information of a first one of the twelve notes;
    (c) identifying an occurrence in the musical information of a second one of the twelve notes;
    (d) identifying a first label corresponding to the first note;
    (e) identifying a second label corresponding to the second note;
    (f) creating a first line connecting the first label and the second label,
    wherein:
    (1) said first line is a first color if the first note and the second note are separated by a half step;
    (2) said first line is a second color if the first note and the second note are separated by a whole step;
    (3) said first line is a third color if the first note and the second note are separated by a minor third;
    (4) said first line is a fourth color if the first note and the second note are separated by a major third;
    (5) said first line is a fifth color if the first note and the second note are separated by a perfect fourth; and
    (6) said first line is a sixth color if the first note and the second note are separated by a tri-tone.

2. The system of claim 1, further comprising:
    a music input device coupled to said processing device;
    wherein said processing device receives said musical information from said music input device.

3. The system of claim 2,
    wherein the system prompts a user to input said musical information as part of an instructional regimen.

4. The system of claim 2, wherein said music input device comprises an analog to digital converter.

5. The system of claim 2, wherein said music input device comprises a digital music player.

6. The system of claim 2, wherein said music input device comprises a MIDI interface.

7. The system of claim 2, wherein said music input device comprises a microphone.

8. The system of claim 2, wherein said music input device comprises a musical instrument.

9. The system of claim 8, wherein said first visual representation is generated in real time in response to a user playing said musical instrument.

10. The system of claim 8, wherein the system provides error indication on the display when the user plays notes that are incorrect in relation to a predetermined musical passage.

11. The system of claim 2, wherein said first visualization is displayed concurrently with a second visual representation, said second visual representation indicating the notes the user is being instructed to play.

12. The system of claim 1, further comprising:
a data storage unit connected to said processing device;
wherein said processing device receives said musical information from said data storage unit.

13. The system of claim 1,
wherein said processing device executes computer readable code to create a second visual representation of said musical information, said second visual representation being simultaneously viewable on the display with said first visual representation.

14. The system of claim 13, wherein said second visual representation comprises traditional music staff notation.

15. The system of claim 13,
wherein said second visual representation comprises a graphical depiction of a First musical instrument.

16. The system of claim 15,
wherein said second visual representation graphically indicates which combination of physical control elements on said first musical instrument corresponds to at least one of said first note and said second note.

17. The system of claim 13,
wherein said processing device executes computer readable code to create a third visual representation of said musical information, said third visualization being simultaneously viewable on the display with said first visual representation and said second visual representation.

18. The system of claim 17,
wherein said third visual representation comprises a graphical depiction of a second musical instrument.

19. The system of claim 13, further comprising:
a user input device for communicating information and command selections to the processing device.

20. The system of claim 19,
wherein the processing device executes computer readable code to change a musical property of said first visual representation when a user manipulates said second visual representation using said user input device to change said musical property.

21. The system of claim 19,
wherein the processing device executes computer readable code to change a musical property of said second visual representation when a user manipulates said first visual representation using said user input device to change said musical property.

22. The system of claim 1,
wherein the processing device executes computer readable code to maintain statistical data for a user.

23. The system of claim 22,
wherein said statistical data comprises information relating to the musical skill level of said user.

24. The system of claim 22,
wherein said statistical data includes a listing of lessons completed by the user in an instructional program.

25. The system of claim 1, further comprising:
an interface operable to connect said processing device with a remote subsystem via a network.

26. The system of claim 1, further comprising:
a scanner coupled to said processing device, wherein the musical properties of said first visual representation are determined based on printed documents scanned by said scanner.

27. A method of music instruction, comprising the steps of:
(a) labeling the perimeter of a circle with twelve labels on a display corresponding to twelve respective notes in an octave, such that moving clockwise or counter-clockwise between adjacent ones of said labels represents a musical half-step;
(b) receiving musical information;
(c) identifying an occurrence in the musical information of a first one of the twelve notes;
(d) identifying an occurrence in the musical information of a second one of the twelve notes;
(e) identifying a first label corresponding to the first note;
(f) identifying a second label corresponding to the second note;
(g) creating a first line connecting the first label and the second label on the display,
wherein:
(1) said first line is a first color if the first note and the second note are separated by a half step;
(2) said first line is a second color if the first note and the second note are separated by a whole step;
(3) said first line is a third color if the first note and the second note are separated by a minor third;
(4) said first line is a fourth color if the first note and the second note are separated by a major third;
(5) said first line is a fifth color if the first note and the second note are separated by a perfect fourth; and
(6) said first line is a sixth color if the first note and the second note are separated by a tri-tone.

28. The method of claim 27, further comprising the steps of:
(a) simultaneously displaying said first note and said second note on the display using traditional music staff notation.

29. The method of claim 27, further comprising the steps of:
(a) simultaneously displaying a graphical representation of a musical instrument on the display, said graphical representation indicating which combination of physical control elements on said first musical instrument correspond to at least one of said first note and said second note.

30. The method of claim 27, wherein said first line is drawn in response to music input by a user.

31. A method of music instruction, comprising the steps of:
(a) labeling the perimeter of a circle with labels corresponding with twelve Respective notes in an octave on a display, such that moving clockwise or counter-clockwise between adjacent ones of said labels represents a musical half-step;
(b) displaying a first line connecting a first label and a second label on the circle;
(c) identifying an occurrence of a first note played by a user;
(d) identifying an occurrence of a second note played by a user;
(e) visually enhancing said first line on the display if said first label corresponds to said first note and said second label corresponds to said second note;

wherein:
(1) said visual enhancement of said first line is a first color if the first note and the second note are separated by a half step;
(2) said visual enhancement of said first line is a second color if the first note and the second note are separated by a whole step;
(3) said visual enhancement of said first line is a third color if the first note and the second note are separated by a minor third;
(4) said visual enhancement of said first line is a fourth color if the first note and the second note are separated by a major third;
(5) said visual enhancement of said first line is a fifth color if the first note and the second note are separated by a perfect fourth; and
(6) said visual enhancement of said first line is a sixth color if the first Note and the second note are separated by a tri-tone.

* * * * *